(12) United States Patent
Choi et al.

(10) Patent No.: US 11,377,548 B2
(45) Date of Patent: Jul. 5, 2022

(54) 2-DIMENSIONAL POLYMER NANOSHEET AND WIDTH, LENGTH, AND HEIGHT TUNABLE METHOD OF PREPARING THE SAME

(71) Applicant: SNU R&DB FOUNDATION, Seoul (KR)

(72) Inventors: Tae-Lim Choi, Seoul (KR); Sanghee Yang, Goyang-si (KR); Sung-Yun Kang, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 0 days.

(21) Appl. No.: 17/232,179

(22) Filed: Apr. 16, 2021

(65) Prior Publication Data

US 2021/0324190 A1    Oct. 21, 2021

(30) Foreign Application Priority Data

Apr. 16, 2020 (KR) .......................... 10-2020-0046153
Apr. 12, 2021 (KR) .......................... 10-2021-0046882

(51) Int. Cl.
   *C08L 53/00*    (2006.01)
   *C08L 47/00*    (2006.01)

(52) U.S. Cl.
   CPC .............. *C08L 53/00* (2013.01); *C08L 47/00* (2013.01)

(58) Field of Classification Search
   CPC . C08L 47/00; C08L 53/00; C07C 6/02; C08G 2261/418
   See application file for complete search history.

(56) References Cited

PUBLICATIONS

Yang et al. Journal of the American Chemical Society, J. Am. Chem. Soc. 2017, 139, 3082-3088 (Year: 2017).*
Choi et al. Journal of the American Chemical Society, J. Am. Chem. Soc. 2018, 140, 17218-17225 (Year: 2018).*
Song et al. Int. J. Mol. Sci. 2019, 20, 5166 (Year: 2019).*

(Continued)

*Primary Examiner* — Mark S Kaucher
(74) *Attorney, Agent, or Firm* — Brundidge & Stanger, P.C.

(57) ABSTRACT

Semi-conducting two-dimensional (2D) nanoobjects, prepared by self-assembly of conjugated polymers, are promising materials for optoelectronic applications. However, there has been no example of 2D nanosheets with controlled lengths and aspect ratios at the same time via self-assembly. Herein, the inventors successfully prepared uniform semi-conducting 2D sheets using a conjugated poly(cyclopentenylene vinylene) homopolymer and its block copolymer by blending and heating. Using these as 2D seeds, living crystallization-driven self-assembly (CDSA) was achieved by adding the homopolymer as a unimer. Interestingly, unlike typical 2D CDSA examples showing radial growth, this homopolymer assembled only in one direction. Owing to this uniaxial growth, the lengths of the 2D nanosheets could be precisely tuned with narrow dispersity according to the unimer-to-seed ratio. The inventors also studied the growth kinetics of the living 2D CDSA and confirmed first-order kinetics. Subsequently, the inventors prepared several 2D block comicelles (BCMs), including penta-BCMs in a one-shot method.

20 Claims, 50 Drawing Sheets

(56) References Cited

PUBLICATIONS

Sanghee Yang, "Formation of uniform one-dimensional- and two-dimensional-nanostructures from fluorescent semiconducting polymers with orthorhombic crystalline orientation", General meeting, Koreanchemical society, Apr. 18-19, 2019, Suwon, Korea, 23 pages.
Sanghee Yang, Tae-Lim Choi, "Formation of uniform one-dimensional- and two-dimensional-nanostructures from fluorescent semiconducting polymers with orthorhombic crystalline orientation", Sixth International Symposium Frontiers in Polymer Science, Frontiers in polymer science, May 5-8, 2019, Budapest, Hungary, 2 pages.

* cited by examiner

FIG. 2A (ii)
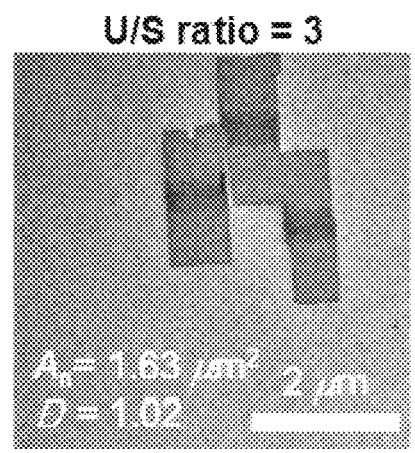
FIG. 2A (iii)
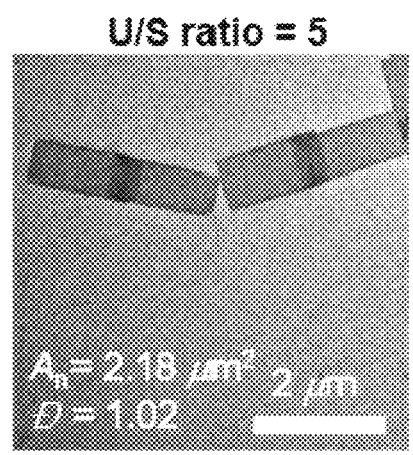

FIG. 2A (iv)
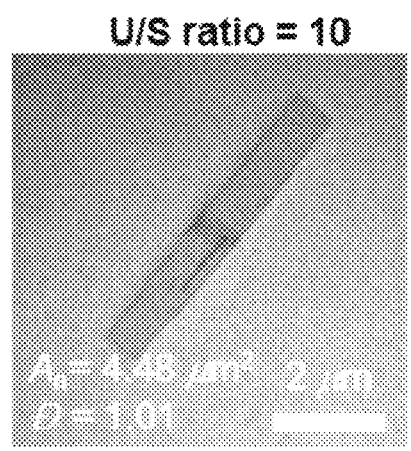
FIG. 2A (v)
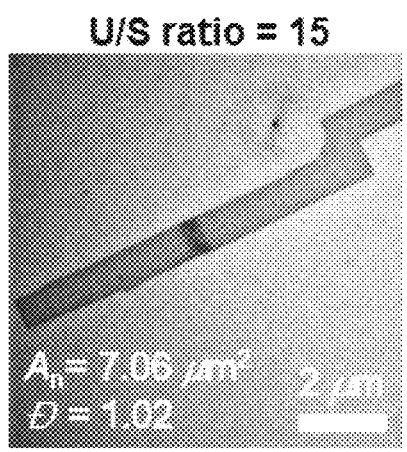

FIG. 2E (ii)
U/S ratio = 10
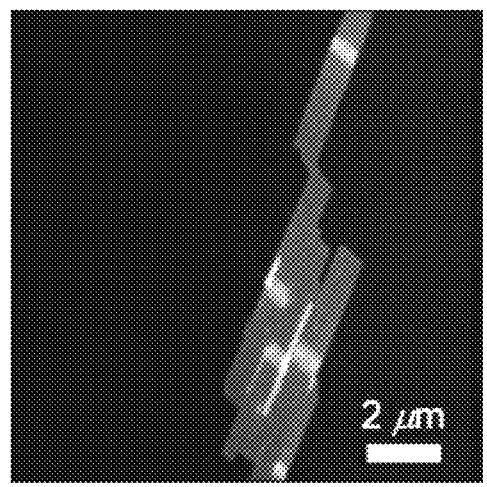
FIG. 2E (iii)
U/S ratio = 15
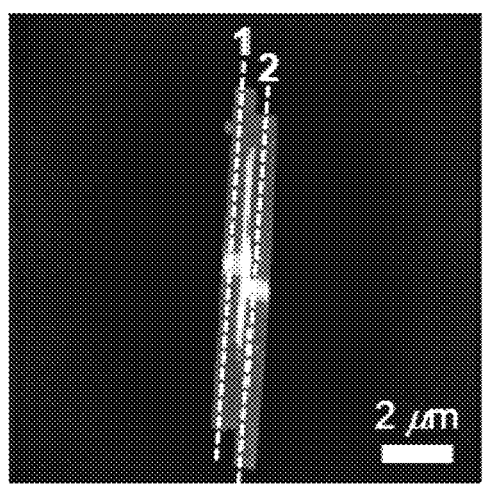

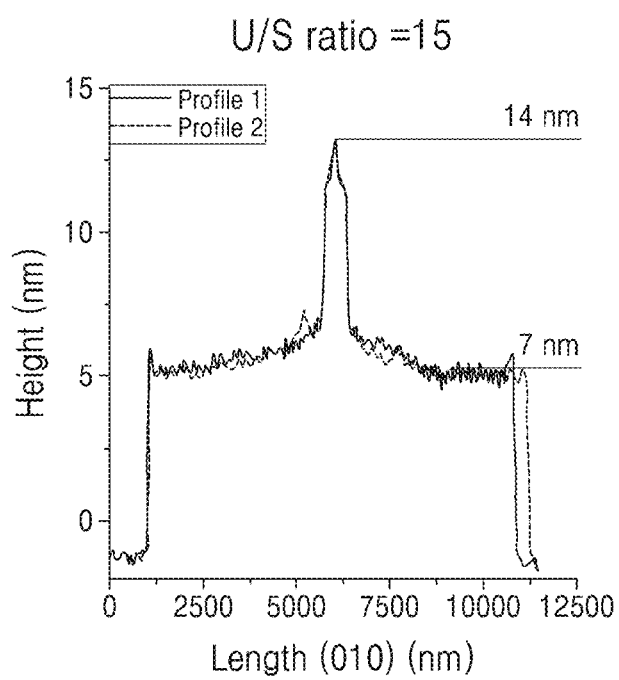
FIG. 2E (iv)

FIG. 4B (ii)
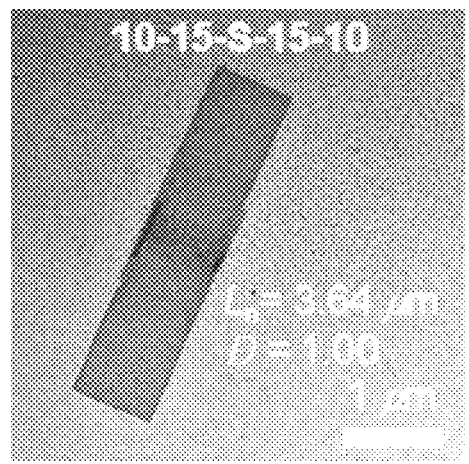
FIG. 4C (i)
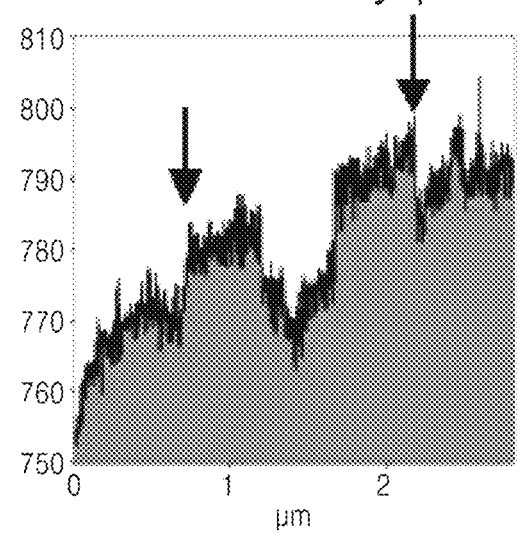

FIG. 4C (ii)
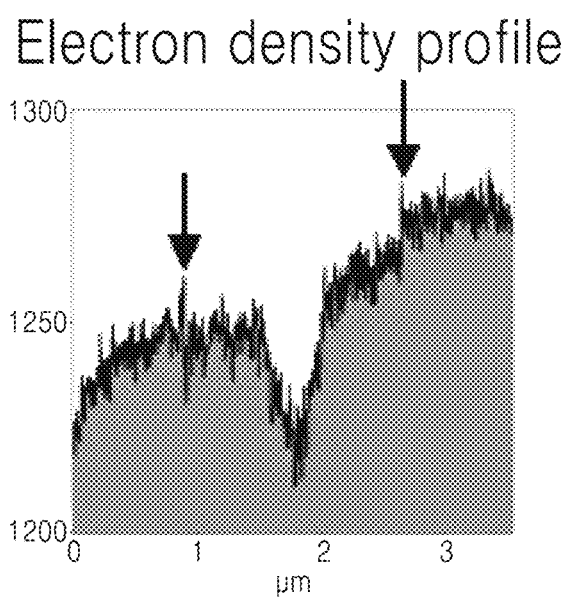
FIG. 4D (i)
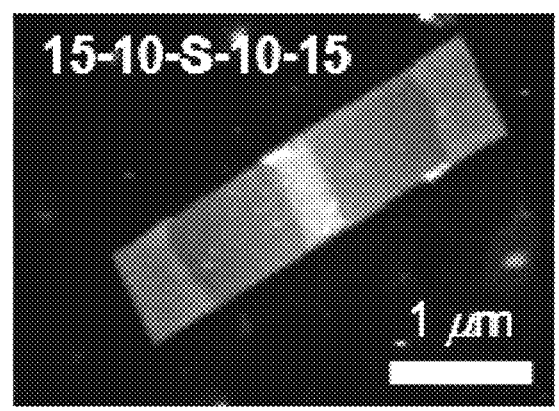

FIG. 4D (ii)
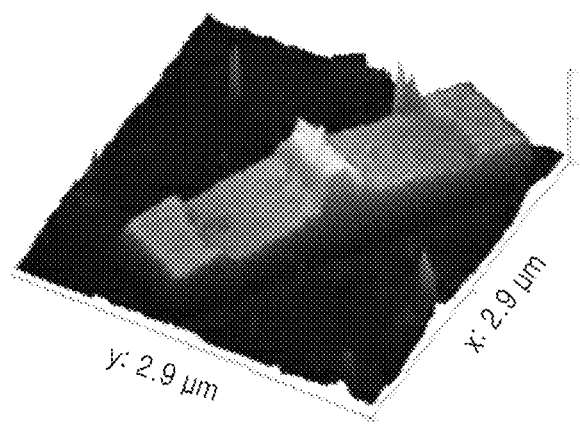
FIG. 4D (iii)
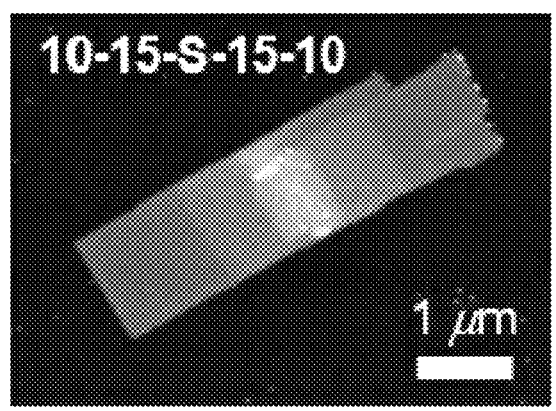

FIG. 4D (iv)
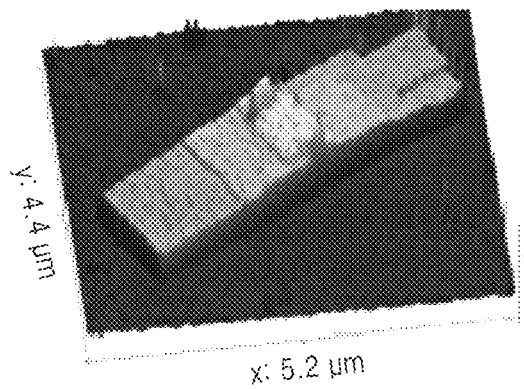
FIG. 4E
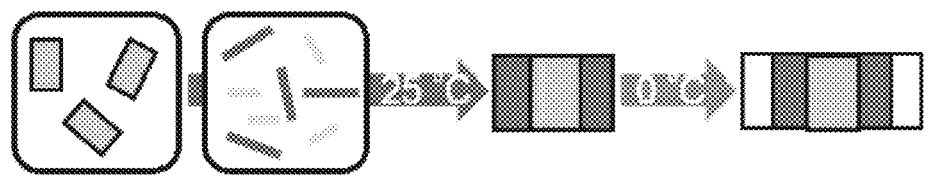
FIG. 4F (i)
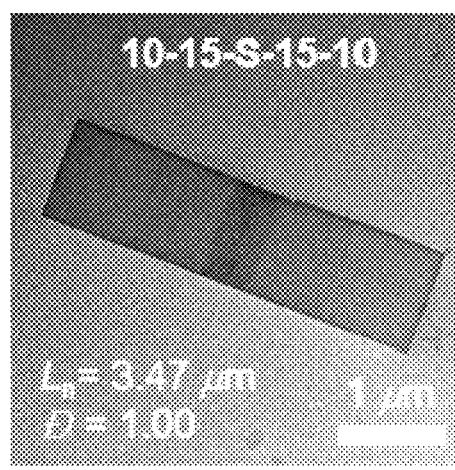

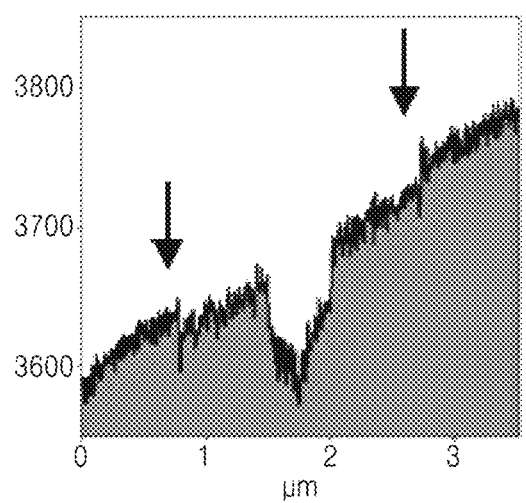
FIG. 4F (ii)

2-DIMENSIONAL POLYMER NANOSHEET AND WIDTH, LENGTH, AND HEIGHT TUNABLE METHOD OF PREPARING THE SAME

CROSS-REFERENCE TO RELATED APPLICATION

This application claims the benefit under 35 USC 119(a) of Korean Patent Applications No. 10-2020-0046153 filed on Apr. 16, 2020, and No. 10-2021-0046882 filed on Apr. 12, 2021, in the Korean Intellectual Property Office, the entire disclosures of which are incorporated herein by reference for all purposes.

TECHNICAL FIELD

The present disclosure relates to a 2-dimensional polymer nanosheet, and width, length, and height tunable method of preparing the same.

BACKGROUND

Two-dimensional (2D) organic/polymeric nanosheets have attracted tremendous attention due to their unique properties arising from their ultra-thin and flat morphology. For instance, semi-conducting 2D materials such as graphene show optoelectronic properties that have been applied in the fields of sensors, electronic transfer platforms, and photovoltaic cells. To prepare such functional 2D nanostructures by solution process, self-assembly of semi-crystalline block copolymers (BCPs) containing a solubilizing amorphous block is one of the most powerful and facile way to achieve various morphologies including rectangles, hexagons, diamonds, and squares. Their core crystalline blocks can be varied from non-conjugated polymers, such as poly(ferrocenyl dimethylsilane) (PFS), poly(lactic acid) (PLLA), poly(ε-caprolactone) (PCL), and polyethylene (PE), to conjugated ones, including poly(3-hexylthiophene) (P3HT), and poly(para-phenylenevinylene) (PPV).

Since the properties of these nanomaterials are size-dependent, there have been numerous efforts to develop strategies including simple blending and heating to modulate their sizes, shapes, and dimensions. In particular, the most powerful and widely utilized method is crystallization-driven self-assembly (CDSA), creating uniform one-dimensional (1D) and 2D nanomaterials. Taking advantage of their living polymerization-like process, preparing even more complex block comicelles is possible. However, unlike inorganic or small organic molecules, semi-crystalline polymers undergo chain-folding during CDSA. In the case of 2D nanosheets, this leads to radial growth of 2D lamellae, such that the aspect ratio can be predicted, but the current technology does not allow for precise control of the length. In particular, for semi-conducting 2D nanosheets, there is another limitation in that the strong π-π interaction of the conjugated polymers lowers the solubility of the 2D nanostructures, resulting in irregular aggregation and uncontrolled self-assembly. While some problems may be solved by synthesizing BCPs containing non-conjugated shell blocks, these insulating blocks further limit the potential of the 2D nanosheets as electronic materials.

Despite the current success in controlling 2D nanostructures, understanding the 2D crystallization process in solution is still in its infancy. This application is of great importance as it allows the design of new polymers, broadening the scope of 2D nanostructures. To this end, the Manners group recently reported a growth kinetic study on the formation of 1D nanofibers. They observed that the conformational effect from the amorphous shell block of the BCPs disturbed the self-assembly process so that the kinetics were more complicated than those of analogous living polymerization and assembly of small molecules. In order to obtain a clear kinetic study, controlled self-assembly of homopolymers is required to eliminate this conformational effect of BCPs. However, CDSA from homopolymers without a stabilizing shell block is extremely challenging, with only a few successes reported by the Manners group, who used a novel strategy of introducing a charged end group into homopolymers, thereby inducing electrostatic repulsion. Due to these limitations, the kinetics of polymer self-assembly, especially quantitative 2D growth, have not been studied yet.

SUMMARY

In view of the foregoing, the present disclosure provides a 2-dimensional polymer nanosheet, and width, length, and height tunable method of preparing the same.

However, problems to be solved by the present disclosure are not limited to the above-described problems. Although not described herein, other problems to be solved by the present disclosure can be clearly understood by those skilled in the art from the following descriptions.

A first aspect of the present disclosure provides a 2-dimensional polymer nanosheet, including a block copolymer represented by the following Chemical Formula 1 or the following Chemical Formula 2; and a homopolymer represented by the following chemical formula 3:

[Chemical Formula 1]

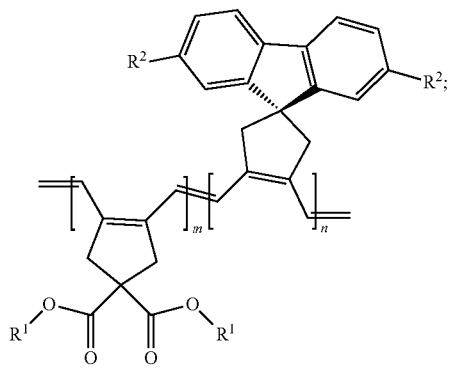

[Chemical Formula 2]

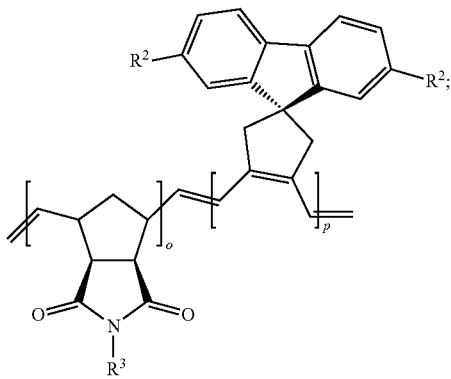

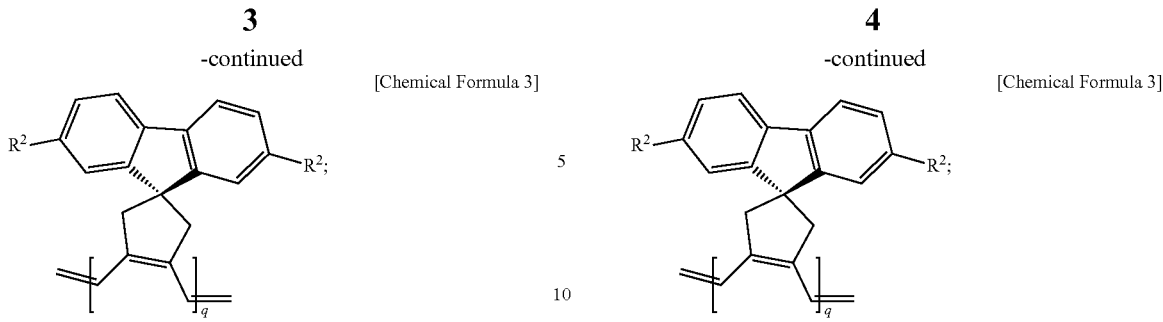

[Chemical Formula 3]

wherein, in the above Chemical Formula 1, Chemical Formula 2, and Chemical Formula 3, each of $R^1$ to $R^3$ is independently, a substituted or unsubstituted, linear or branched $C_{1-8}$ alkyl group, when at least one from $R^1$ to $R^3$ is substituted, it is substituted by —SiR$^a$R$^b$R$^c$, each of $R^a$, $R^b$, and $R^c$ is independently a linear or branched $C_{1-4}$ alkyl group, each of m and o is independently an integer of 20 to 70, each of n and p is independently an integer of 5 to 70, and q is an integer of 5 to 70.

A second aspect of the present disclosure provides a method of preparing a 2-dimensional polymer nanosheet according to the first aspect of the present disclosure, including:

(a) mixing a block copolymer represented by the following Chemical Formula 1 or the following Chemical Formula 2, and a homopolymer represented by the following Chemical Formula 3 to obtain a 2-dimensional seed; and (b) adding an unimer including the homopolymer represented by the following Chemical Formula 3 to the 2-dimensional seed to obtain a 2-dimensional polymer nanosheet:

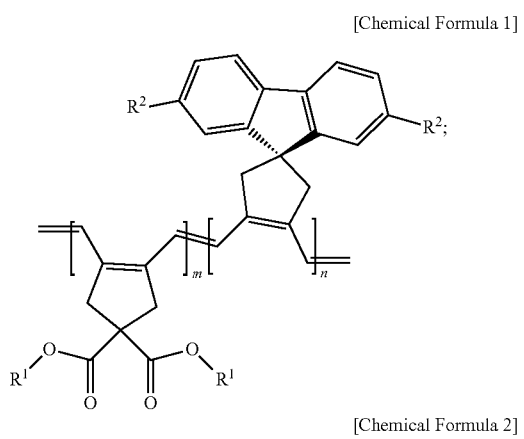

[Chemical Formula 1]

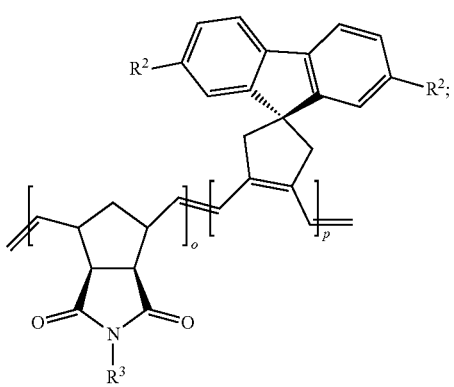

[Chemical Formula 2]

wherein, in the above Chemical Formula 1, Chemical Formula 2, and Chemical Formula 3, each of $R^1$ to $R^3$ is independently, a substituted or unsubstituted, linear or branched $C_{1-8}$ alkyl group, when at least one from $R^1$ to $R^3$ is substituted, it is substituted by —SiR$^a$R$^b$R$^c$, each of $R^a$, $R^b$, and $R^c$ is independently a linear or branched $C_{1-4}$ alkyl group, each of m and o is independently an integer of 20 to 70, each of n and p is independently an integer of 5 to 70, and q is an integer of 5 to 70.

A third aspect of the present disclosure provides a device, including a 2-dimensional polymer nanosheet according to the first aspect of the present disclosure.

In exemplary embodiments of the present disclosure, the inventors successfully prepared uniform semi-conducting 2D sheets without stacking by blending strategy. Living crystallization-driven self-assembly (CDSA) was achieved by adding the homopolymer as a unimer to the prepared initial 2D seed by the preparing method. Interestingly, unlike typical 2D CDSA examples showing radial growth, this homopolymer assembled only in one direction. Owing to this uniaxial growth, the lengths of the 2D nanosheets could be precisely tuned from 1.5 to 8.8 μm with narrow dispersity according to the unimer-to-seed ratio. The inventors also studied the growth kinetics of the living 2D CDSA and confirmed first-order kinetics. Subsequently, the inventors prepared several 2D block comicelles (BCMs) using unimers with various molecular weight, including penta-BCMs in a one-shot method.

In exemplary embodiments of the present disclosure, in the process of preparing the 2D seed, a second solvent (co-solvent) different from a first solvent may be added to tune the width and/or length of the 2D seed formed according to the addition ratio of the second solvent. In addition, the length of the finally formed 2D nanosheet is tunable according to the U/S (unimer-to-seed) ratio of the unimer. Lastly, according to the molecular weight, i.e. the degree of polymerization, of the unimer, it is possible to form a block comicelle with various heights.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

According to examples of the present disclosure.

1C shows schematic representation of the formation of 2D seeds and their proposed detailed structures, included is their crystal array and observed crystal growth rates. Further.

According to examples of the present disclosure, FIG. 2A(i) to 2A(v) show TEM images of length and area controlled 2D rectangles with respective U/S ratios of 2, 3, 5, 10, and 15 [Numbers in the images indicate the average area ($A_n$) and dispersity]

According to examples of the present disclosure.

According to examples of the present disclosure, FIG. 4E shows Scheme for the preparation of one 2D BCM by one-shot addition of two unimers, and FIGS. 4F(i) and 4F(ii) are respectively TEM image and electron density profile of the penta-BCM obtained by one-shot living CDSA [Numbers in the images indicate the average length ($L_n$) and dispersity].

DETAILED DESCRIPTION

Figure 1A:
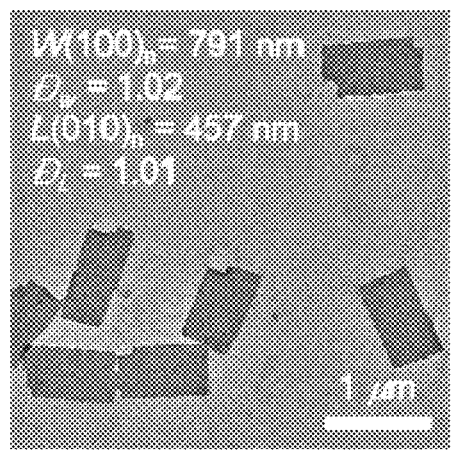
FIG. 1A is TEM image of uniform 2D seeds generated by a heating and aging method using 2:1 blend ratio of P1$_{50}$-b-P2$_{22}$ and P2$_{22}$ homopolymer [Numbers in the image indicate the average width ($W_n$), length ($L_n$), and dispersity]

Hereinafter, examples of the present disclosure will be described in detail with reference to the accompanying drawings so that the present disclosure may be readily implemented by those skilled in the art. However, it is to be noted that the present disclosure is not limited to the examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through this whole specification, a phrase in the form "A and/or B" means "A or B, or A and B".

Through the whole document, the term "alkyl" includes linear or branched alkyl groups having 1 to 12 carbon atoms, 1 to 10 carbon atoms, 1 to 8 carbon atoms, 1 to 5 carbon atoms, or 1 to 4 carbon atoms and all the possible isomers thereof. For example, the alkyl group may include methyl group (Me), ethyl group (Et), n-propyl group ($^n$Pr), iso-propyl group ($^i$Pr), n-butyl group ($^n$Bu), iso-butyl group ($^i$Bu), tert-butyl group ($^t$Bu), sec-butyl group ($^s$Bu), n-pentyl group ($^n$Pe), iso-pentyl group ($^{iso}$Pe), sec-pentyl group ($^{sec}$Pe) tert-pentyl group ($^t$Pe), neo-pentyl group ($^{neo}$Pe), 3-pentyl group, n-hexyl group, iso-hexyl group, heptyl group, 4,4-dimethyl pentyl group, octyl group, 2,2,4-trimethyl pentyl group, nonyl group, decyl group, undecyl group, dodecyl group, and isomers thereof, but may not be limited thereto.

Hereinafter, embodiments and examples of the present disclosure will be described in detail with reference to the accompanying drawings. However, the present disclosure may not be limited to the following embodiments, examples, and drawings.

A first aspect of the present disclosure provides a 2-dimensional polymer nanosheet, including a block copolymer represented by the following Chemical Formula 1 or the following Chemical Formula 2; and a homopolymer represented by the following chemical formula 3:

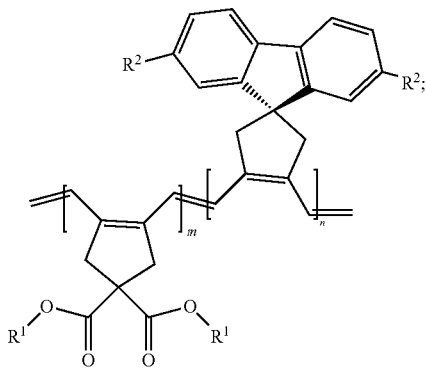

[Chemical Formula 1]

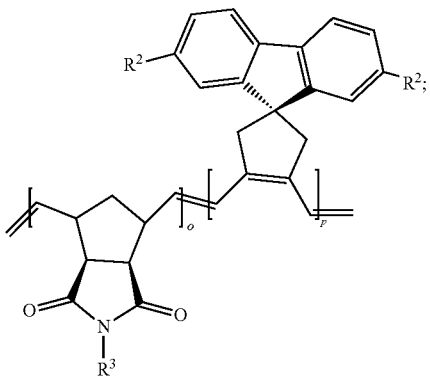

[Chemical Formula 2]

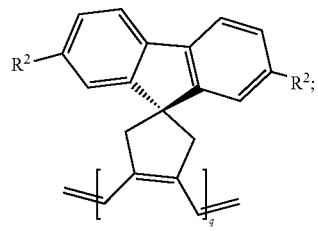

[Chemical Formula 3]

wherein, in the above Chemical Formula 1, Chemical Formula 2, and Chemical Formula 3, each of $R^1$ to $R^3$ is independently, a substituted or unsubstituted, linear or branched $C_{1-8}$ alkyl group, when at least one from $R^1$ to $R^3$ is substituted, it is substituted by —$SiR^aR^bR^c$, each of $R^a$, $R^b$, and $R^c$ is independently a linear or branched $C_{1-4}$ alkyl group, each of m and o is independently an integer of 20 to 70, each of n and p is independently an integer of 5 to 70, and q is an integer of 5 to 70.

In an exemplary embodiment of the present disclosure, each of $R^1$ and $R^3$ may be independently, substituted or unsubstituted, methyl, ethyl, n-propyl, iso-propyl, n-butyl, sec-butyl, iso-butyl, tert-butyl, n-pentyl, sec-pentyl, 3-pentyl, iso-pentyl, tert-pentyl, neo-pentyl, sec-isopentyl, 2-methylbutyl, n-hexyl, sec-hexyl, 3-hexyl, iso-hexyl, tert-hexyl, sec-isohexyl, 3-isohexyl, 2-methylpentyl, 3,3-dimethylbutyl, 3-ethylbutyl, 2,2-dimethylbutyl, n-heptyl, iso-heptyl, neo-heptyl, tert-heptyl, sec-heptyl, n-octyl, iso-octyl, or 2-ethylhexyl, but may not be limited thereto. In an exemplary embodiment of the present disclosure, each of $R^1$ and $R^3$ is independently, substituted or unsubstituted, methyl, ethyl, n-propyl, iso-propyl, n-butyl, sec-butyl, iso-butyl, tert-butyl, n-pentyl, sec-pentyl, 3-pentyl, iso-pentyl, tert-pentyl, neo-pentyl, sec-isopentyl, 2-methylbutyl, or n-hexyl.

In an exemplary embodiment of the present disclosure, $R^2$ may be, substituted or unsubstituted, methyl, ethyl, n-propyl, iso-propyl, n-butyl, iso-butyl, sec-butyl, tert-butyl, n-pentyl, sec-pentyl, iso-pentyl, tert-pentyl, neo-pentyl, sec-pentyl, 3-pentyl, iso-pentyl, tert-pentyl, neo-pentyl, sec-isopentyl, 2-methylbutyl, n-hexyl, sec-hexyl, 3-hexyl, iso-hexyl, tert-hexyl, sec-isohexyl, 3-isohexyl, 2-methylpentyl, 3,3-dimethylbutyl, 3-ethylbutyl, or 2,2-dimethylbutyl, but may not be limited thereto. In an exemplary embodiment of the present disclosure, $R^2$ may be 3,3-dimethylbutyl or trimethylsilylethyl.

In an exemplary embodiment of the present disclosure, —SiR$^a$R$^b$R$^c$ may be —SiMe$_3$, —SiEt$_3$, —SiPr$_3$, —SiBu$_3$, —SiEtMe$_2$, —SiEt$_2$Me, —SiMe$_2$Pr, —SiMePr$_2$, —SiBuMe$_2$, —SiBu$_2$Me, —SiEt$_2$Pr, —SiEtPr$_2$, —SiBuEt$_2$, —SiBu$_2$Et, —SiBuPr$_2$, or —SiBu$_2$Pr.

In an exemplary embodiment of the present disclosure, a width (100) of the 2-dimensional polymer nanosheet may be about 100 nm to about 10 µm, but may not be limited thereto. For example, the width (100) of the 2-dimensional polymer nanosheet may be about 100 nm to about 10 µm, about 100 nm to about 5 µm, about 100 nm to about 1 µm, about 100 nm to about 900 nm, about 100 nm to about 800 nm, about 100 nm to about 700 nm, about 100 nm to about 600 nm, about 100 nm to about 500 nm, about 100 nm to about 400 nm, about 100 nm to about 300 nm, about 100 nm to about 200 nm, about 200 nm to about 10 µm, about 200 nm to about 5 µm, about 200 nm to about 1 µm, about 200 nm to about 900 nm, about 200 nm to about 800 nm, about 200 nm to about 700 nm, about 200 nm to about 600 nm, about 200 nm to about 500 nm, about 200 nm to about 400 nm, about 200 nm to about 300 nm, about 300 nm to about 10 µm, about 300 nm to about 5 µm, about 300 nm to about 1 µm, about 300 nm to about 900 nm, about 300 nm to about 800 nm, about 300 nm to about 700 nm, about 300 nm to about 600 nm, about 300 nm to about 500 nm, about 300 nm to about 400 nm, about 400 nm to about 10 µm, about 400 nm to about 5 µm, about 400 nm to about 1 µm, about 400 nm to about 900 nm, about 400 nm to about 800 nm, about 400 nm to about 700 nm, about 400 nm to about 600 nm, about 400 nm to about 500 nm, about 500 nm to about 10 µm, about 500 nm to about 5 µm, about 500 nm to about 1 µm, about 500 nm to about 900 nm, about 500 nm to about 800 nm, about 500 nm to about 700 nm, about 500 nm to about 600 nm, about 600 nm to about 10 µm, about 600 nm to about 5 µm, about 600 nm to about 1 µm, about 600 nm to about 900 nm, about 600 nm to about 800 nm, about 600 nm to about 700 nm, about 700 nm to about 10 µm, about 700 nm to about 5 µm, about 700 nm to about 1 µm, about 700 nm to about 900 nm, about 700 nm to about 800 nm, about 800 nm to about 10 µm, about 800 nm to about 5 µm, about 800 nm to about 1 µm, about 800 nm to about 900 nm, about 900 nm to about 10 µm, about 900 nm to about 5 µm, about 900 nm to about 1 µm, about 1 µm to about 10 µm, about 1 µm to about 5 µm, or about 5 µm to about 10 µm, but may not be limited thereto.

In an exemplary embodiment of the present disclosure, a length (010) of the 2-dimensional polymer nanosheet may be about 500 nm to about 20 µm, but may not be limited thereto. For example, the length (010) of the 2-dimensional polymer nanosheet may be about 500 nm to about 20 µm, about 500 nm to about 15 µm, about 500 nm to about 10 µm, about 500 nm to about 5 µm, about 500 nm to about 1 µm, about 500 nm to about 900 nm, about 500 nm to about 800 nm, about 500 nm to about 700 nm, about 500 nm to about 600 nm, about 600 nm to about 20 µm, about 600 nm to about 15 µm, about 600 nm to about 10 µm, about 600 nm to about 5 µm, about 600 nm to about 1 µm, about 600 nm to about 900 nm, about 600 nm to about 800 nm, about 600 nm to about 700 nm, about 700 nm to about 20 µm, about 700 nm to about 15 µm, about 700 nm to about 10 µm, about 700 nm to about 5 µm, about 700 nm to about 1 µm, about 700 nm to about 900 nm, about 700 nm to about 800 nm, about 800 nm to about 20 µm, about 800 nm to about 15 µm, about 800 nm to about 10 µm, about 800 nm to about 5 µm, about 800 nm to about 1 µm, about 800 nm to about 900 nm, about 900 nm to about 20 µm, about 900 nm to about 15 µm, about 900 nm to about 10 µm, about 900 nm to about 5 µm, about 900 nm to about 1 µm, about 1 µm to about 20 µm, about 1 µm to about 15 µm, about 1 µm to about 10 µm, about 1 µm to about 5 µm, about 5 µm to about 20 µm, about 5 µm to about 15 µm, about 5 µm to about 10 µm, about 10 µm to about 20 µm, about 10 µm to about 15 µm, or about 15 µm to about 20 µm, but may not be limited thereto.

In an exemplary embodiment of the present disclosure, a height of the 2-dimensional polymer nanosheet may be about 1 nm to about 500 nm, but may not be limited thereto. For example, the height of the 2-dimensional polymer nanosheet may be about 1 nm to about 500 nm, about 1 nm to about 400 nm, about 1 nm to about 300 nm, about 1 nm to about 200 nm, about 1 nm to about 100 nm, about 1 nm to about 50 nm, about 1 nm to about 10 nm, 10 nm to about 500 nm, about 10 nm to about 400 nm, about 10 nm to about 300 nm, about 10 nm to about 200 nm, about 10 nm to about 100 nm, about 10 nm to about 50 nm, 50 nm to about 500 nm, about 50 nm to about 400 nm, about 50 nm to about 300 nm, about 50 nm to about 200 nm, about 50 nm to about 100 nm, 100 nm to about 500 nm, about 100 nm to about 400 nm, about 100 nm to about 300 nm, about 100 nm to about 200 nm, about 200 nm to about 500 nm, about 200 nm to about 400 nm, about 200 nm to about 300 nm, about 300 nm to about 500 nm, about 300 nm to about 400 nm, or about 400 nm to about 500 nm, but may not be limited thereto.

In an exemplary embodiment of the present disclosure, the 2-dimensional polymer nanosheet may have conductivity and/or fluorescence.

A second aspect of the present disclosure provides a method of preparing a 2-dimensional polymer nanosheet according to the first aspect of the present disclosure, including:

(a) mixing a block copolymer represented by the following Chemical Formula 1 or the following Chemical Formula 2, and a homopolymer represented by the following Chemical Formula 3 to obtain a 2-dimensional seed; and (b) adding an unimer including the homopolymer represented by the following Chemical Formula 3 to the 2-dimensional seed to obtain a 2-dimensional polymer nanosheet:

[Chemical Formula 1]

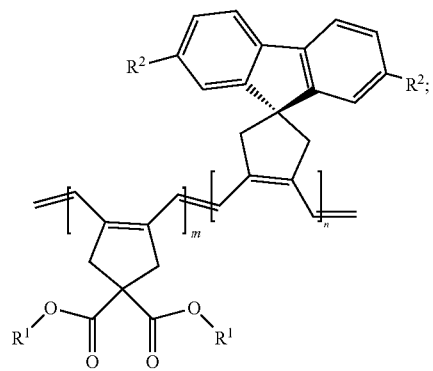

-continued

[Chemical Formula 2]

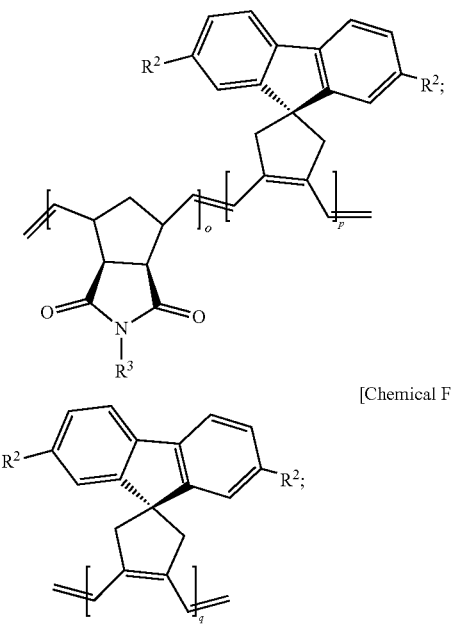

[Chemical Formula 3]

wherein, in the above Chemical Formula 1, Chemical Formula 2, and Chemical Formula 3, each of $R^1$ to $R^3$ is independently, a substituted or unsubstituted, linear or branched $C_{1-8}$ alkyl group, when at least one from $R^1$ to $R^3$ is substituted, it is substituted by —$SiR^aR^bR^c$, each of $R^a$, $R^b$, and $R^c$ is independently a linear or branched $C_{1-4}$ alkyl group, each of m and o is independently an integer of 20 to 70, each of n and p is independently an integer of 5 to 70, and q is an integer of 5 to 70.

Detailed descriptions on the second aspect of the present disclosure, which overlap with those on the first aspect of the present disclosure, are omitted hereinafter, but the descriptions of the first aspect of the present disclosure may be identically applied to the second aspect of the present disclosure, even though they are omitted hereinafter.

In an exemplary embodiment of the present disclosure, in (a), the 2-dimensional seed may be formed by co-assembly of the block copolymer and the homopolymer.

In an exemplary embodiment of the present disclosure, in (b), the 2-dimensional polymer nanosheet may be formed by seeded-growth.

In an exemplary embodiment of the present disclosure, (a) may be conducted in presence of a first solvent, and in (a), a width of the 2-dimensional seed may be tunable by adding a second solvent different from the first solvent. Here, the first solvent may be at least one selected from chloroform, dichloromethane, and tetrahydrofuran, and wherein the second solvent may be at least one selected from methyl chloride, dichloromethane (DCM; or methylene chloride, MC), chloroform, tetrahydrofuran, toluene, chlorobenzene, dichlorobenzene, and o-dichlorobenzene, but may not be limited thereto. In an exemplary embodiment of the present disclosure, the first solvent may be chloroform, and the second solvent may be dichloromethane.

In an exemplary embodiment of the present disclosure, the width of the 2-dimensional seed may be adjusted according to the added amount of the second solvent. In particular, the width of the 2-dimensional seed may be adjusted according to the volume ratio of the second solvent.

In an exemplary embodiment of the present disclosure, in (b), a length of the 2-dimensional polymer nanosheet may be tunable according to the weight ratio of the unimer to the 2-dimensional seed.

In an exemplary embodiment of the present disclosure, in (b), a height of the 2-dimensional polymer nanosheet may be tunable according to degree of polymerization of the added unimer. Here, a block comicelle may be formed by adding at least two unimers of which degree of polymerization is different to each other, but may not be limited thereto. For example, a penta-block comicelle may be formed by adding two unimers of which degree of polymerization is different to each other.

In an exemplary embodiment of the present disclosure, the at least two unimers of which degree of polymerization is different to each other may be added simultaneously or sequentially, but may not be limited thereto. Here, even if the unimers are added simultaneously, the seeded-growth of one type of unimer takes place preferentially, so that the block comicelle can be formed in a one-shot method.

In an exemplary embodiment of the present disclosure, the method may further include a heating step and/or an aging step in (a) and/or (b), but may not be limited thereto. In an exemplary embodiment of the present disclosure, in (a), the block copolymer represented by Chemical Formula 1 or Chemical Formula 2, and the homopolymer represented by Chemical Formula 3 may be mixed, heated and then aged. In an exemplary embodiment of the present disclosure, in (b), the unimer including the homopolymer represented by Chemical Formula 3 may be added to the 2-dimensional seed, and then aged.

A third aspect of the present disclosure provides a device, including a 2-dimensional polymer nanosheet according to the first aspect of the present disclosure.

Detailed descriptions on the third aspect of the present disclosure, which overlap with those on the first and second aspects of the present disclosure, are omitted hereinafter, but the descriptions of the first and second aspects of the present disclosure may be identically applied to the third aspect of the present disclosure, even though they are omitted hereinafter.

In an exemplary embodiment of the present disclosure, the two-dimensional polymer nanosheet of the present disclosure may be included and/or applied without limitation as long as the device is a device using electrical/thermal conductivity and/or fluorescence of the two-dimensional polymer nanosheet of the present disclosure.

In an exemplary embodiment of the present disclosure, the device is transistor, sensor, imaging agent, light emitting diode, photovoltaic cell, or conductive display, but may not be limited thereto.

Hereinafter, example embodiments are described in more detail by using Examples, but the present disclosure may not limited to the Examples.

EXAMPLES

1. General Materials and Polymers

Without additional notes, all reagents were commercially available from Sigma-Aldrich, Tokyo Chemical Industry Co. Ltd., Acros Organics, Alfa Aesar and were used without further purification. Solvents for monomer synthesis were also commercially available, but they for polymerization are used after further-distillation under Ar(g). All the reactions were conducted under the Ar(g), and monitored by thin-layer chromatography carried out on pre-coated plates (MERCK TLC silica gel 60, F254). For purification, flash column chromatography was performed using MERCK silica gel 60 (0.040~0.063 mm). For polymerization, the Grubbs third-generation (G3) catalyst was prepared following the reported literature.

Polymers

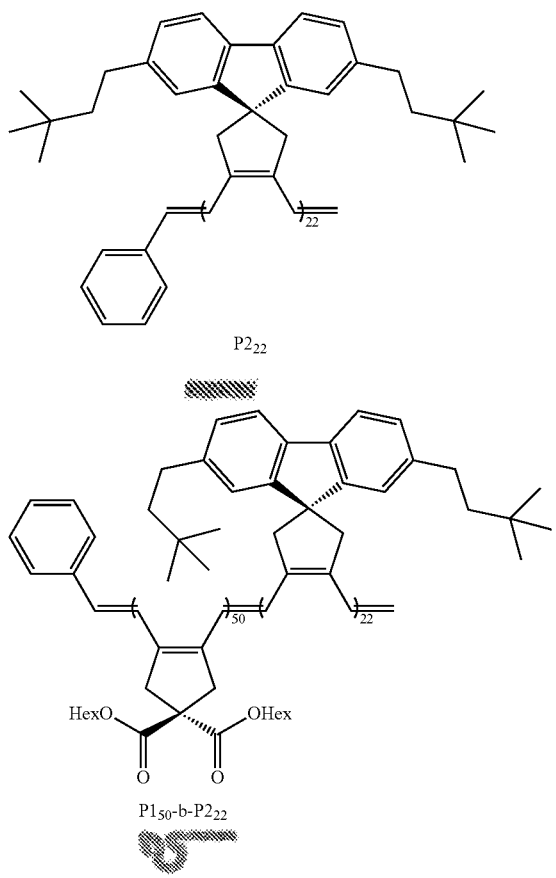

P2$_{22}$

P1$_{50}$-b-P2$_{22}$

TABLE 1

| sample | Ratio of block | $M_n$ (kDa) | Đ |
|---|---|---|---|
| P1$_{50}$-b-P2$_{22}$ | 50:22 | 38.6 | 1.10 |
| P2$_{22}$ | — | 9.01 | 1.13 |
| P2$_{10}$ | — | 4.98 | 1.15 |
| P2$_{13}$ | — | 5.61 | 1.18 |
| P2$_{15}$ | — | 6.05 | 1.13 |

2. Methods (1) Polymerization Procedure

A 4 mL sized screw-cap vial with septum was flame dried and charged with a monomer and a magnetic bar. The vial was purged with Ar(g) three times, and degassed anhydrous THF was added (M1: a monomer of P1, M2: a monomer of P2, [M1]$_0$=0.5 M or [M2]$_0$=0.1 M). After the Ar(g)-purged G3 catalyst in the other 4 mL vial was dissolved in 50 μL THF, the solution was rapidly injected to the monomer solution at 0° C. under vigorous stirring. After the complete conversion of M1 to P1 (or M2 to P2 for P2 homopolymer), for the block copolymer (BCP) formation, the second monomer (M2) was added ([M2]0=0.1 M) to the vial at 0° C. The reaction was quenched by excess ethyl vinyl ether (EVE) after the desired reaction time and precipitated in methanol at room temperature. The obtained purple solid was filtered and dried in vacuo. Those monomer conversions were calculated from the $^1$H NMR spectra of the remained crude mixture.

(2) Preparation of Blends of P1$_{50}$-b-P2$_{22}$ and P2$_{22}$

Each polymer (P1$_{50}$-b-P2$_{22}$ and P2$_{22}$) was dissolved in 0.5 g/L chloroform (more than 0.5 mL in 4 mL vial). Without aging, two solutions were mixed at room temperature with various P1$_{50}$-b-P2$_{22}$ and P2$_{22}$ with a ratio of 2:1 (or molar ratio of 1:2).

(3) Preparation of 2D Seeds from the Blend by Heating and Aging

The blended solutions were sealed with a Teflon lined cap and heated at 50° C. for 1 hour, followed by cooling down to 25° C. and aging for 3 days. The resulting 2D nanoparticles were observed by AFM and TEM imaging. In details, samples for TEM and AFM imaging were prepared by spin-coating one drop (ca. 0.05 mL) of the 2D seeds colloidal solution onto a carbon-coated copper grid (for TEM imaging) or freshly cleaved mica (for AFM imaging) (spinning rate=3000 rpm for 30 secs). Device-related information is described in the Supplementary Information.

(4) Preparation of 2D Rectangles with Tunable Length Via Living 2D CDSA of P2$_n$ Unimers After diluting the 2D seeds solution to 0.03 g/L chloroform, a solution of lower molecular weight P2$_n$ (unimer, $M_n$=5.0-6.1 kDa, Đ<1.18) in 10 g/L chloroform was added to the solution of the 2D seeds with various unimer-to-seed (U/S) mass ratios. Then the samples were aged at X ° C. (variable temperatures).

(5) Growth Kinetic Studies of the Living 2D CDSA

To conduct growth kinetic studies of the 2D assembly in solution, we monitored the living 2D assembly over aging time after adding the unimer solution to the seed solution. For each nanostructure, length, width, height, area, aspect ratio, and angle distributions were estimated from the TEM and AFM images manually using the ImageJ software package which developed at the US National Institute of Health. For the statistical length analyses, more than 30 randomly picked objects were processed to determine the average values depending on the data set. Every particle in each image was counted to reduce subjectivity.

3. Results and Discussions (1) Focus of this Study

The inventors previously reported that conjugated PCPV homopolymers containing fluorene and bulky substituents successfully underwent self-assembly because of their uniform orthorhombic crystalline arrays. For example, the semi-crystalline P2$_{22}$ [$M_n$=9.01 kDa (Đ=1.13)] homopolymer directly assembled into 2D rectangles in chloroform but any control of the structure was impossible because of its low solubility. The inventors then expanded this moiety to BCP microstructures composed of identical core-forming P2$_{22}$ blocks and solubilizing P1$_{50}$ shell blocks [P1$_{50}$-b-P2$_{22}$, $M_n$=38.6 kDa (Đ=1.10)]. This modification stabilized the P2 crystalline block, enabling precise control of widths and lengths via living CDSA, but a limitation was that only 1D nanofibers were prepared by this method. Based on these earlier investigations, the inventors attempted the formation of uniform 2D nanosheets by blending P2$_{22}$ and P1$_{50}$-b-P2$_{22}$ to achieve controlled co-assembly. Partially introduced P1 shell blocks in the blends should stabilize the main crystal array of the P2$_{22}$ homopolymer, overcoming the solubility issue of 2D nanorectangles in solution. To achieve this co-assembly, the inventors used a simple heating and aging method using the blends in chloroform and screened various conditions by changing the mass ratios of the two polymers, concentration, and temperature.

(2) Preparation of Uniform Monolayer Seed

Figure 1B:
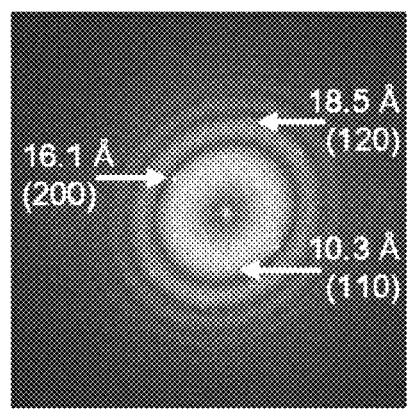
FIG. 1B shows FFT pattern from the HR-TEM image of the single 2D seed showing three main d-spacings of 10.3 Å, 18.5 Å, and 16.1 Å and their corresponding (hkl) planes, and FIG.
Figure 1C:
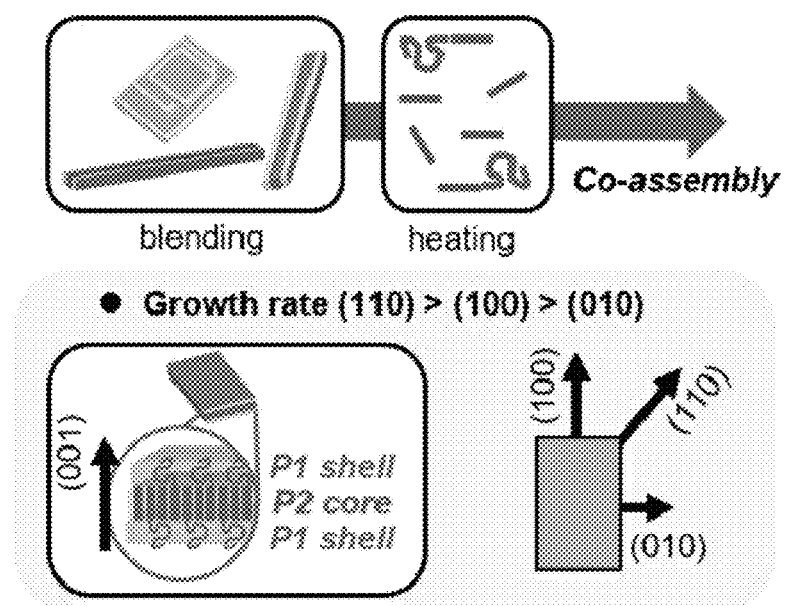
FIG. 1D shows AFM image of 2D seeds and FIG. 1E shows height profile along the white lines shown in the AFM image.
Figure 1D:
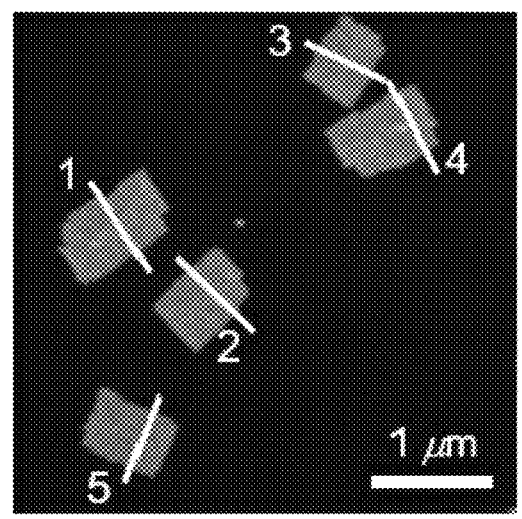
Figure 1E:
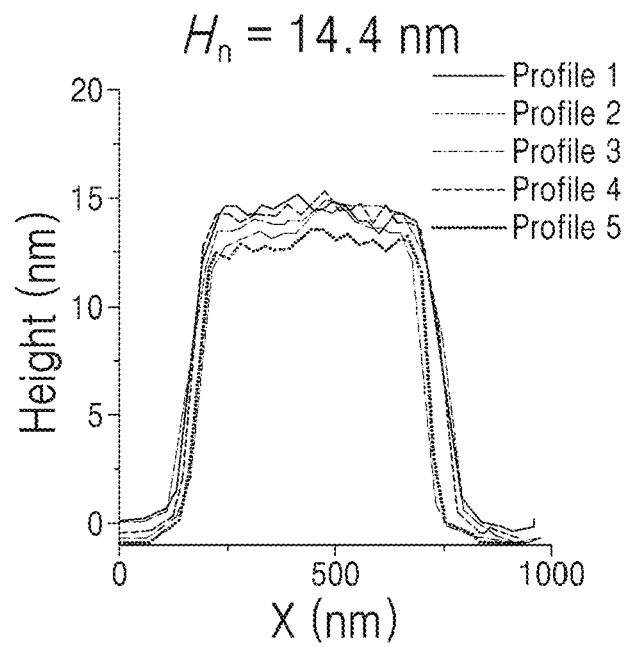

After many optimizations, excellent co-assembly was achieved by heating a blend solution of $P1_{50}$-b-$P2_{22}$ and $P2_{22}$ at a ratio of 2:1 (or molar ratio of 1:2) in 0.5 g/L chloroform at 50° C. for 1 h. After cooling to 25° C. and aging for 3 days, transmission electron microscopy (TEM) imaging showed uniform mono-layers of 2D rectangles with an aspect ratio of 1.73 and an average angle of 92.9°, demonstrating excellent self-assembly via a self-seeding mechanism (FIG. 1A). Furthermore, the resulting 2D seeds had a uniform width ($W_n$) of 790.7 (±104.8) nm, length ($L_n$) of 456.7 (±39.6) nm, and an area ($A_n$) of 0.36 (±0.063) μm² with very narrow length and area dispersity (<1.02). Cryogenic TEM imaging by freezing a low concentration of 0.05 g/L in chloroform also confirmed that this 2D self-assembly occurred in solution and not by solvent evaporation. To gain insight into these co-assembled 2D seeds, the inventors analyzed their electron diffraction patterns by fast Fourier transform (FFT) analysis from the high-resolution TEM (HR-TEM) image (FIG. 1B). The resulting diffraction analysis showed an orthorhombic crystal lattice with main d-spacing values of 10.3 Å, 16.1 Å, and 18.5 Å, which were identical to those of the reported P2 homopolymer. This supports the conclusion that the blend of two polymers having common P2 cores co-crystallized into 2D seeds (FIG. 1C). Interestingly, the longer sides of the 2D rectangles always coincided with the direction of the (100) plane of the crystalline array. During the aging process, polymer nucleation formed small nuclei first, which then grew in both directions with slightly faster growth along the (100) plane than the (010) plane of the crystalline P2 core (cf. (110)>(100)>(010), FIG. 1X=C). Finally, the uniform 2D seeds having rectangular shapes with two distinct, well-defined crystalline surfaces were formed. In addition, The fact that the P2 core block stands up on the surface along the (001) direction of the 2D crystal lattice implies that the P1 shell blocks from the BCP would occupy the top and bottom of the 2D seeds, thereby suppressing the multi-stacking problem frequently observed in the previous single P2 assembly and making the 2D seeds colloidally stable. This orientation also affected the height of the 2D seeds, which was measured by AFM analysis. Their average height ($H_n$) was 14.4±0.4 nm, which was 3 nm higher than that of the previous 2D rectangles just from the P2 homopolymer without the additional P1 shell block (FIGS. 1D and 1E).

(3) The Tunable Area (Length) of 2D Nanosheet

Figure 2A:
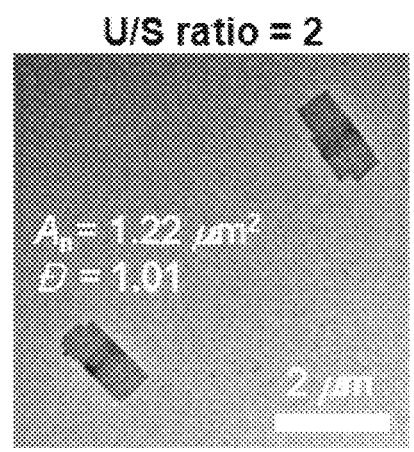
FIGS. 2B and 2C are respectively plots showing the linear dependence of the area ($A_n$) and the average length ($L_n$) in the (010) direction versus U/S ratios, demonstrating living 2D CDSA. Further.
FIG. 2D is DLS profiles showing an increase in Dh from U/S ratio of 2 to 15 after three weeks of aging, FIGS. 2E(i) to 2E(iii) are respectively AFM images of the resulting 2D rectangles prepared from U/S ratios of 3, 10, and 15, and FIG. 2E(iv) shows a height profile of the 2D rectangles with U/S ratio of 15, demonstrating a height difference (7.8 nm of the newly formed 2D sheets versus 14.4 nm of the original 2D seeds).
FIG. 2F shows schematic representation of the living 2D CDSA via uniaxial seeded-growth along the (010) direction and the 2D schematic illustration of resulting 2D rectangles is based on the interdigitating slip-stack packing model of P2 homopolymer with the simplified structure in ab plane.
Figure 2B:
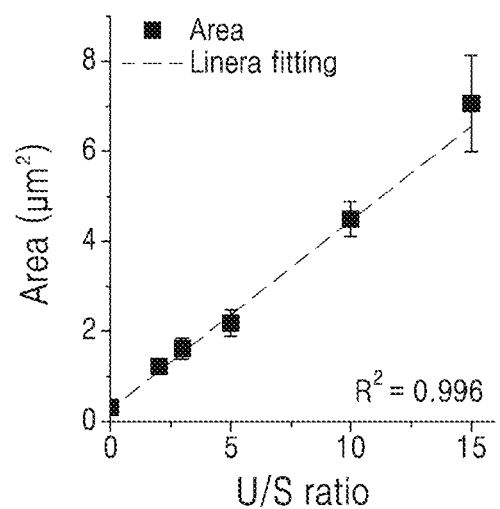
Figure 2C:
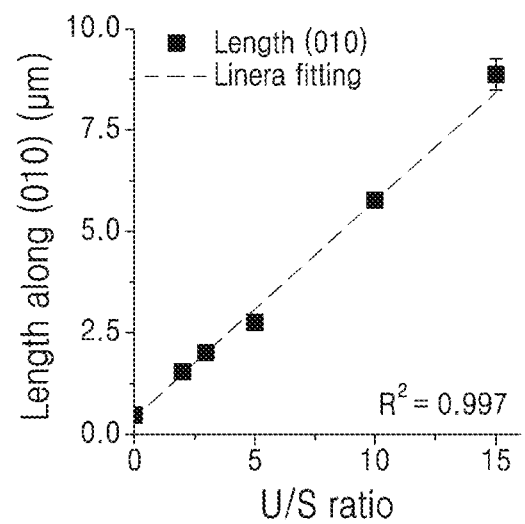
Figure 2D:
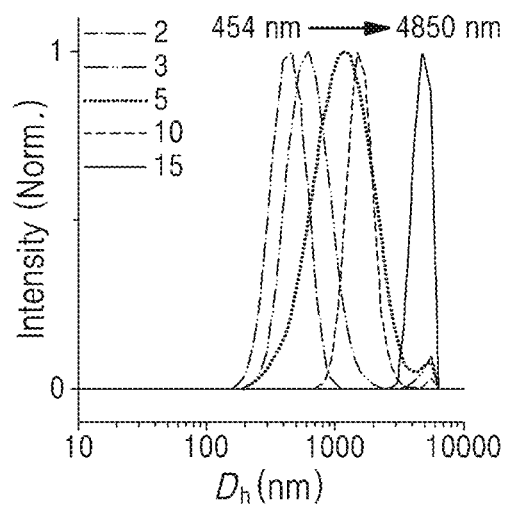
Figure 2E:
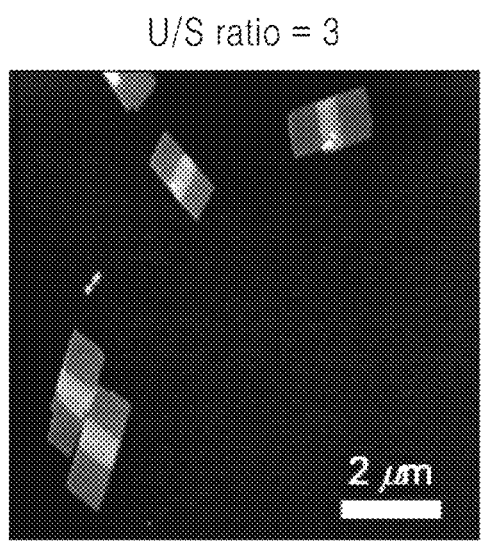
Figure 2F:
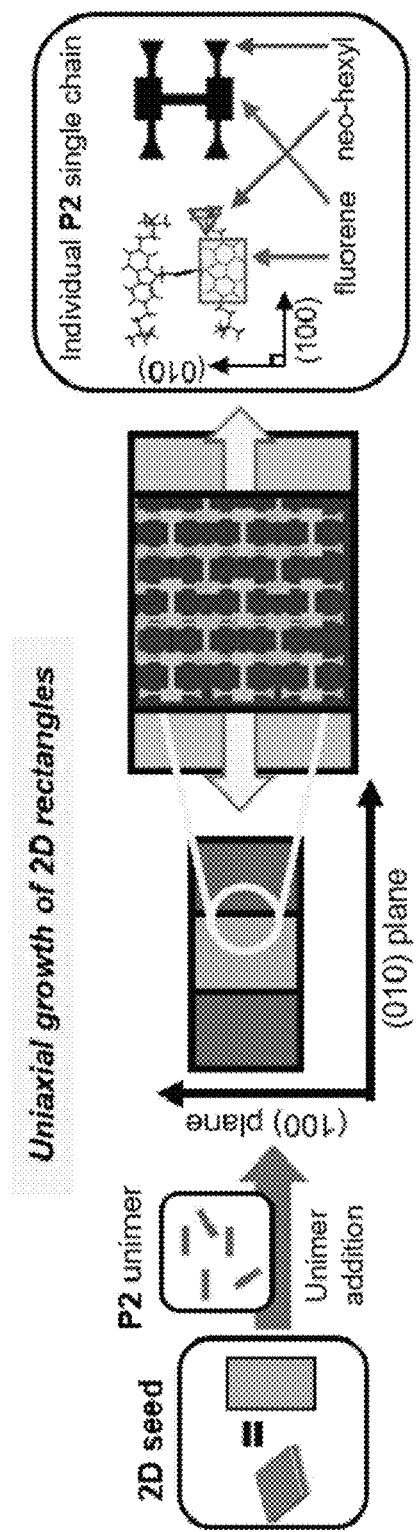

With the uniform 2D seeds in hand, the inventors investigated the possibility of CDSA via seeded growth to further control the area of 2D nanosheets. A solution of lower molecular weight $P2_{10}$ (unimer, $M_n$=5.0 kDa, Đ=1.15) in 10 g/L chloroform was added to a solution of the 2D seeds in 0.03 g/L chloroform ($A_n$ of 0.32 (±0.059) μm²) with various unimer-to-seed (U/S) mass ratios from 2 to 15. After optimizations, $P2_{10}$ successfully underwent CDSA to form uniform 2D rectangles, whose area increased linearly from 1.2 to 7.1 μm² (Đ<1.02) according to U/S ratios after 3 weeks of aging at −13° C. (FIGS. 2A(i) to 2A(v), and 2B). From the TEM images of the resulting 2D rectangles, the central 2D seeds appear darker, making them easily distinguishable from the newly formed 2D sheets derived from the $P2_{10}$ unimer (FIGS. 2A(i) to 2A(v)). To our surprise, unlike other 2D platelets that grew in radial (both terminal and lateral) directions relative to the seeds, these 2D rectangles from the $P2_{10}$ unimer grew only in one direction along the (010) plane of the 2D seeds. This uniaxial growth enabled us to control the $L_n$ (010) of the resulting 2D rectangles from 1.5 to 8.8 μm while maintaining the width ($W_n$) of the (100) direction (FIG. 2C). Low-magnification TEM images show that the length dispersity was less than 1.03, indicating successful living 2D CDSA. Living CDSA was also qualitatively supported by DLS analysis, where the Dr, values in chloroform solution gradually increased from 454 nm to 4.9 μm as the U/S ratios increased (FIG. 1D). The height of 2D rectangles in the (001) direction by AFM analysis also revealed a distinct difference between the 2D seeds and the newly formed 2D sheets (ca. 14.4±0.4 nm versus 7.8±0.6 nm, respectively) due to a higher DP of the P2 blocks for the seeds (FIGS. 2E(i) to 2E(iv)). To understand this unique uniaxial growth of the 2D rectangles along the (010) direction of the seeds as opposed to the faster growth in the (100) direction of the seed formation process which might be under thermodynamic influence, the inventors closely examined the orientation of the orthorhombic crystal lattice of the P2 homopolymer in the 2D seeds (FIG. 2F). Its (010) plane was occupied by rigid fluorene moieties of the P2 chains and would probably have much higher surface energy compared to the (100) plane exposing the neohexyl group. Therefore, during the elongation process, such distinct crystalline planes of the 2D seeds would allow the P2 unimers to kinetically crystallize onto the direction of higher surface energy, thereby leading to the preferential crystallization of unimers along the (010) direction. Similarly, in the inventors' previous finding, the 2D rectangular nanosheets from another PCPV homopolymer containing silyl groups also grew faster in the (010) direction than in the (100) direction with the 2D seeds having distinct crystalline surfaces. In addition, the P2 chains containing trans-alkenes exclusively seemed to exhibit a fully extended conformation without chain folding in the 2D arrays, thereby maximizing the selective assembly of unimers to the seeds. This defect-free CDSA might have produced the resulting 2D sheets having sharp edges with a nearly perfect right angle.

(3) Kinetic Studies on 2D CDSA

Figure 3A:
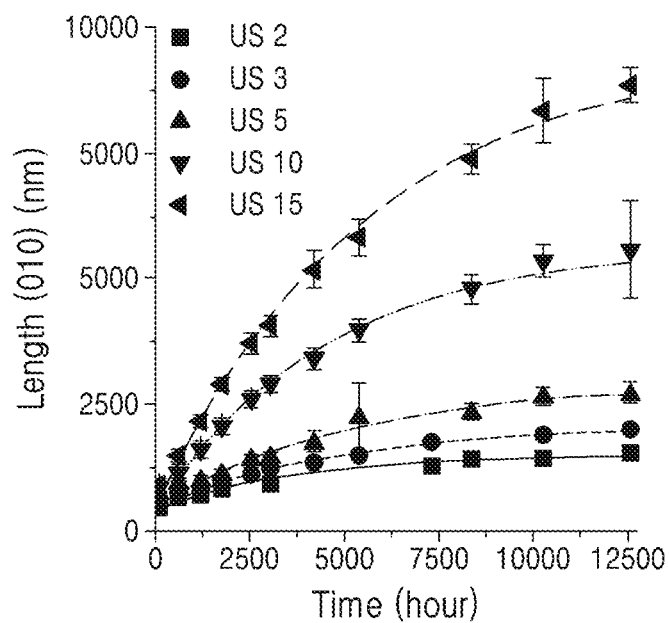
FIGS. 3A and 3B are respectively plots showing Lengths ($L_n$) of 2D rectangles over time with various U/S ratios from 2 to 15 (monitored for three weeks) and initial reaction rates versus unimer concentration, [U], to confirm first-order kinetics. Further.
Figure 3B:
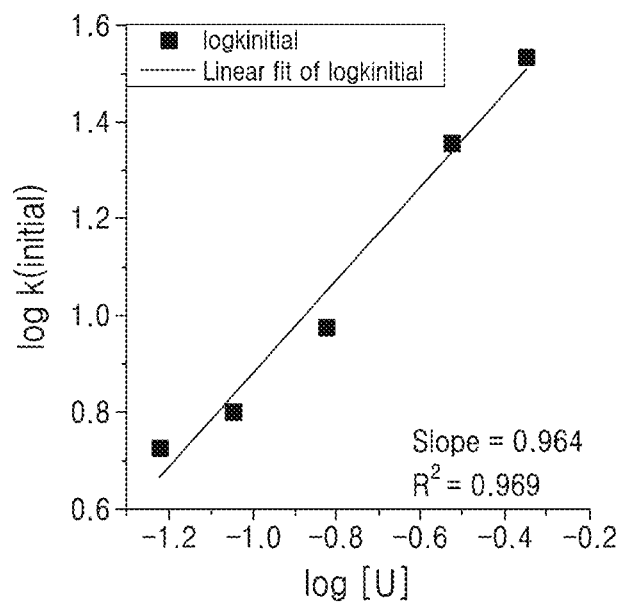

Most notably, this uniaxial-living 2D CDSA is an excellent system for conducting kinetic studies of 2D assembly in solution. By real-time monitoring using TEM analysis, the inventors conducted growth kinetics by adding $P2_{10}$ homopolymer with various U/S ratios under the aforementioned conditions (0.03 g/L seeds in chloroform solutions at −13° C.), and measuring increases in length, as described in FIG. 3A. As expected, the higher U/S ratio and concentration of unimer, $[U]_0$, led to faster elongation. Interestingly, plotting $L_n$ growth versus time fitted very well with the first-order kinetic function of $[U]_0$, with $R^2$ values greater than 0.991, similar to conventional living polymerization (Table 2, Entries 1-5). The rate constants (k') were also consistent within experimental errors regardless of the U/S ratio. Using an alternation method, the reaction order of [U], which was calculated from the initial rates by analyzing the $L_n$ increase in the early stages, was 0.964 (±0.085) (FIG. 3B). This further confirmed the first-order kinetics of the living 2D CDSA of the P2 homopolymer. This is an interesting result because previous studies on living 1D CDSA of P1-b-P2 or PFS BCPs showed significant deviation from first-order kinetics. The main difference in the present study is presumably due to the homopolymer microstructure of unimers, unlike BCPs with shell blocks in the previous cases. Therefore, the P2 homopolymer has negligible conformational effects, due to the absence of a shell block.

Finally, P2, which does not even undergo chain-folding, directly forms crystalline arrays, making this 2D CDSA analogous to ideal crystallization, similar to the living supramolecular polymerization of small organic molecules such as porphyrin derivatives.

Figure 3C:
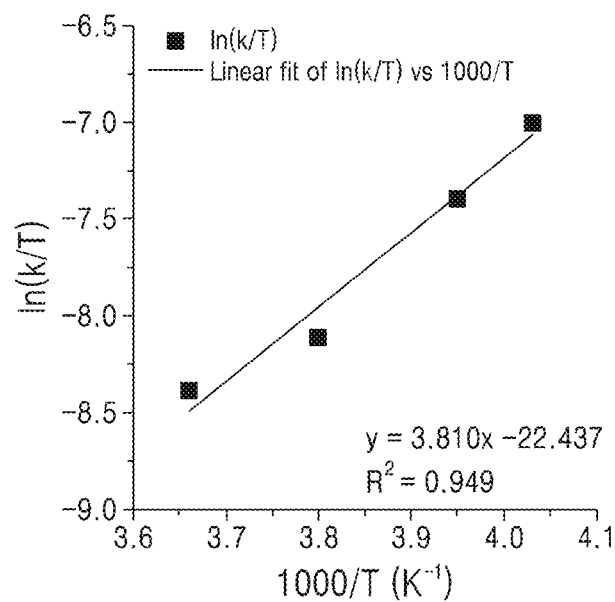
FIGS. 3C and 3D are respectively Eyring plot for the rate constants, k', extracted from seeded-growth experiments at varying temperatures and plot of $\ln(L_{final}-L(time))$ versus time from the first-order growth of various unimers with different DPs at 25° C.
Figure 3D:
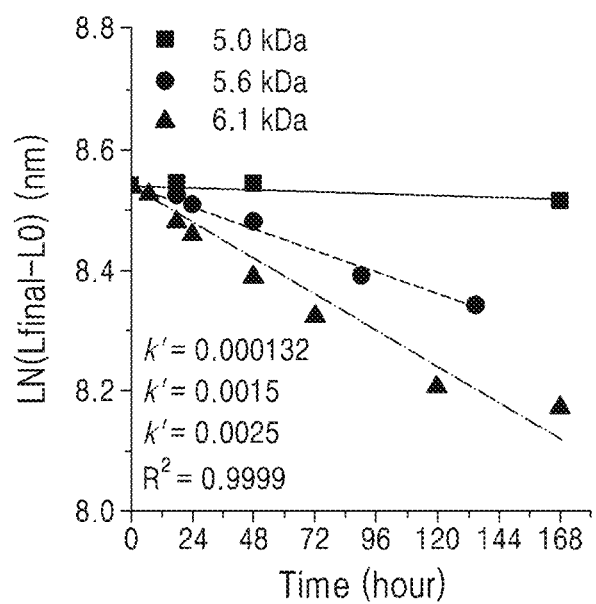

To explore the effect of temperature on CDSA, the inventors again measured the rates at four different temperatures: 0, −10, −20, and −25° C. After first-order fitting, the initial rate constant k' was found to increase from $3.0 \times 10^{-3}$ to $1.1 \times 10^{-2}$ as the temperature decreased from 0 to −25° C. These values allowed us to generate an Eyring plot to determine the activation enthalpy and entropy for the seeded-growth process, and they were negative values of −31.7 kJ/mol and −384 J/K·mol, respectively, indicating faster growth at lower temperatures (Table 2, Entries 6-9, FIG. 3C). Furthermore, another kinetic study was performed with longer P2 unimers of DP 13 (5.6 kDa (Ð=1.18)) and 15 (6.1 kDa (Ð=1.13)). Since the longer P2 unimers showing high crystallinity easily underwent self-nucleation at low temperatures, all the kinetic experiments were performed at 25° C. for proper comparison. Another first-order fitting of $[U]_0$ provided initial rate constants k' of $1.3 \times 10^{-4}$, $1.5 \times 10^{-3}$, and $2.5 \times 10^{-3}$ (h$^{-1}$) for P2 unimers of DP 10, 13, and 15, respectively (Table 2, Entries 10-12, FIG. 3D). This 20 times faster growth of $P2_{15}$ than $P2_{10}$ is likely due to the higher crystallinity of $P2_{15}$. Similar to our previous report on P2,[42] the average height of the new 2D sheets increased from 7.8 to 10.4 nm according to the DP of P2. With the longer P2 unimers, we were able to conduct living 2D CDSAs with various U/S ratios from 1 to 10 at 25° C., providing tunable $L_n$ of the resulting 2D rectangles from 0.64 μm to 5.5 μm for $P2_{13}$ and from 0.80 μm to 3.3 μm for $P2_{15}$, respectively.

TABLE 2

| entry | unimer (kDa) | Aging temp. (° C.) | U/S ratio | k' (h$^{-1}$) | error (h$^{-1}$) | R$^2$ |
|---|---|---|---|---|---|---|
| 1 | 5.0 | −13 | 2 | $6.5 \times 10^{-3}$ | $6.1 \times 10^{-4}$ | 0.991 |
| 2 | | | 3 | $5.1 \times 10^{-3}$ | $4.0 \times 10^{-4}$ | 0.993 |
| 3 | | | 5 | $4.9 \times 10^{-3}$ | $4.2 \times 10^{-4}$ | 0.991 |
| 4 | | | 10 | $5.4 \times 10^{-3}$ | $4.6 \times 10^{-5}$ | 0.995 |
| 5 | | | 15 | $4.4 \times 10^{-3}$ | $2.5 \times 10^{-5}$ | 0.997 |
| 6 | 5.0 | 0 | 10 | $3.0 \times 10^{-3}$ | $8.4 \times 10^{-5}$ | 0.999 |
| 7 | | −10 | | $3.8 \times 10^{-3}$ | $1.4 \times 10^{-4}$ | 0.999 |
| 8 | | −20 | | $7.3 \times 10^{-3}$ | $2.2 \times 10^{-4}$ | 0.999 |
| 9 | | −25 | | $1.1 \times 10^{-2}$ | $2.7 \times 10^{-4}$ | 0.999 |
| 10 | 5.0 | 25 | 10 | $1.3 \times 10^{-4}$ | $4.3 \times 10^{-5}$ | 0.999 |
| 11 | 5.6 | | | $1.5 \times 10^{-3}$ | $5.9 \times 10^{-5}$ | 0.999 |
| 12 | 6.1 | | | $2.5 \times 10^{-3}$ | $1.4 \times 10^{-4}$ | 0.999 |

(4) Preparation of Multi-Block Comicelle with Adjusted Length and Height

Figure 4A:
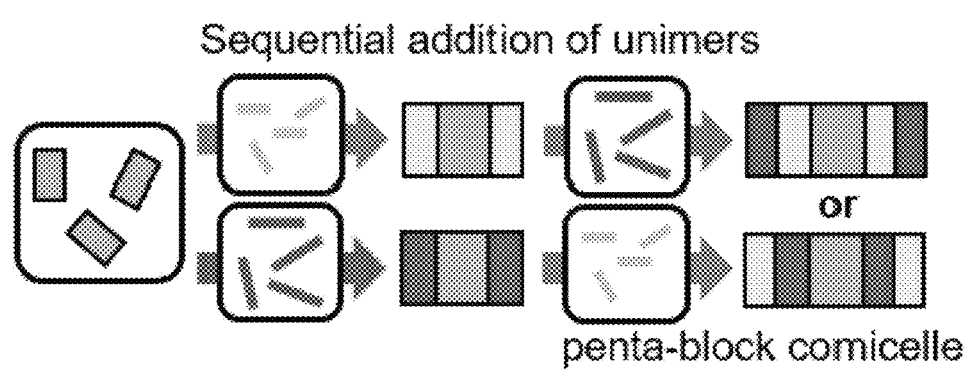
FIG. 4A shows Schemes for the preparation of complex 2D BCMs by sequential addition of two unimers ($P2_{10}$ and $P2_{15}$). By changing the order of the unimer addition, two types of symmetric penta-BCMs were obtained.
Figure 4B:
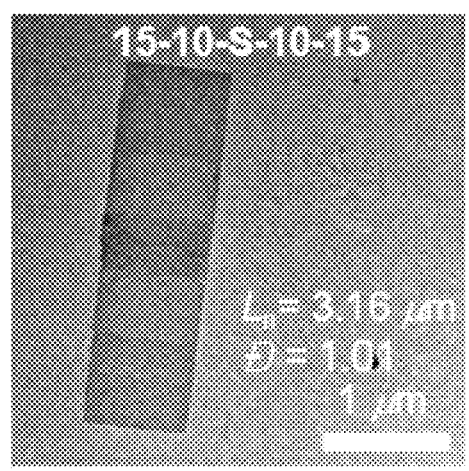
FIGS. 4B(i) and 4B(ii) are TEM images of the penta-BCMs showing clear distinctions of the two types of penta-BCMs prepared by the sequential addition, and FIGS. 4C(i) and 4C(ii) are electron density profiles of the penta-BCMs showing clear distinctions of the two types of penta-BCMs prepared by the sequential addition, and FIGS. 4D(i) to 4D(iv) are respectively 2D, and 3D height AFM images of the penta-BCMs showing clear distinctions of the two types of penta-BCMs prepared by the sequential addition.

Intriguingly, the uniaxial-living 2D CDSA could prepare more complex multi-block comicelles (BCM) via a series of seeded growth from various P2 unimers. Analogous to block copolymerization via living polymerization, the sequential addition of $P2_{10}$ and $P2_{15}$ unimers provided length and height controlled penta-BCMs along the (010) direction (unimers in 10 g/L chloroform, U/S ratio of 3, [2D seeds]= 0.03 g/L in chloroform, FIG. 4A). By changing the addition order, two types of symmetric penta-BCMs, A($P2_{15}$)-B ($P2_{10}$)-S(seed)-B-A and B-A-S-A-B, were generated with uniform length and narrow dispersity (FIGS. 4B(i) and 4B(ii)). A clear distinction in contrast is observed in the TEM images as the A block of $P2_{15}$ appears darker due to its higher electron density than the B block of $P2_{10}$ (FIGS. 4C(i) and 4C(ii)).). Furthermore, AFM analysis also confirms the blocky structure of penta-BCMs, showing another clear difference in the height of 2D sheets (FIGS. 4D(i) and 4B(iv)). The inventors even attempted a more challenging but simple one-shot BCM formation by adding two P2 unimers to 2D seeds at the same time with each U/S ratio of 3 at 25° C. Since more crystalline $P2_{15}$ grew much faster than $P2_{10}$, the longer $P2_{15}$ preferentially assembled on the 2D seeds. Then, lowering the temperature to 0° C. initiated the self-assembly of the shorter $P2_{10}$ via the seeded-growth mechanism, resulting in the formation of the same B-A-S-A-B penta-BCM as that prepared by sequential addition (FIG. 4E). This result demonstrates an excellent example of this new strategy that could be used to construct complex nanostructures based on a deep understanding of the 2D assembly process.

Since these precisely controlled 2D rectangles were composed of fluorescent conjugated PCPVs, they were visible under super-resolution structured illumination microscopy (SR-SIM) without additional dye. Interestingly, 2D seeds in the middle showed much higher fluorescence than the rest of the 2D sheets freshly formed from P2 unimers, indicating that the longer P2 emits stronger light. In addition, a video of the micelle solution recorded by confocal laser scanning microscopy (CLSM) shows a persistent shape and fluorescence stability without decomposition and photobleaching.

(5) Preparation of 2D Nanosheet with Adjusted Width and Length

The inventors have extended this study from the successful preparation of the length-tunable 2D nanosheet to the preparation of the width-tunable 2D nanosheet. In particular, when THF or chloroform was added as a co-solvent in a simple heating and aging method of dichloromethane solution of an example among PCPV homopolymer including fluorene and bulky substituents in the previous study, it was observed that the aspect ratio of nanosheet was tunable according to 18 different content ratios. The crystallinity of the 2D nanosheet was analyzed from film X-ray diffraction patterns and electron diffraction patterns using high-resolution TEM, the linear dependence of the aspect ratio of the nanosheets on the ration of co-solvent was inferred due to the difference between the surface energy of each plane and the crystal growth rate.

Accordingly, the inventors used method of adding the co-solvent and aging method after simple heating based on the linear dependence of the co-solvent effect in order to achieve preparation of 2D nanosheet in which the width and length were simultaneously adjusted using the blend. Specifically, various conditions were screened by changing the ratio and the concentration of the co-solvent from the method of preparing the uniform monolayer 2D seed.

Figure 5:
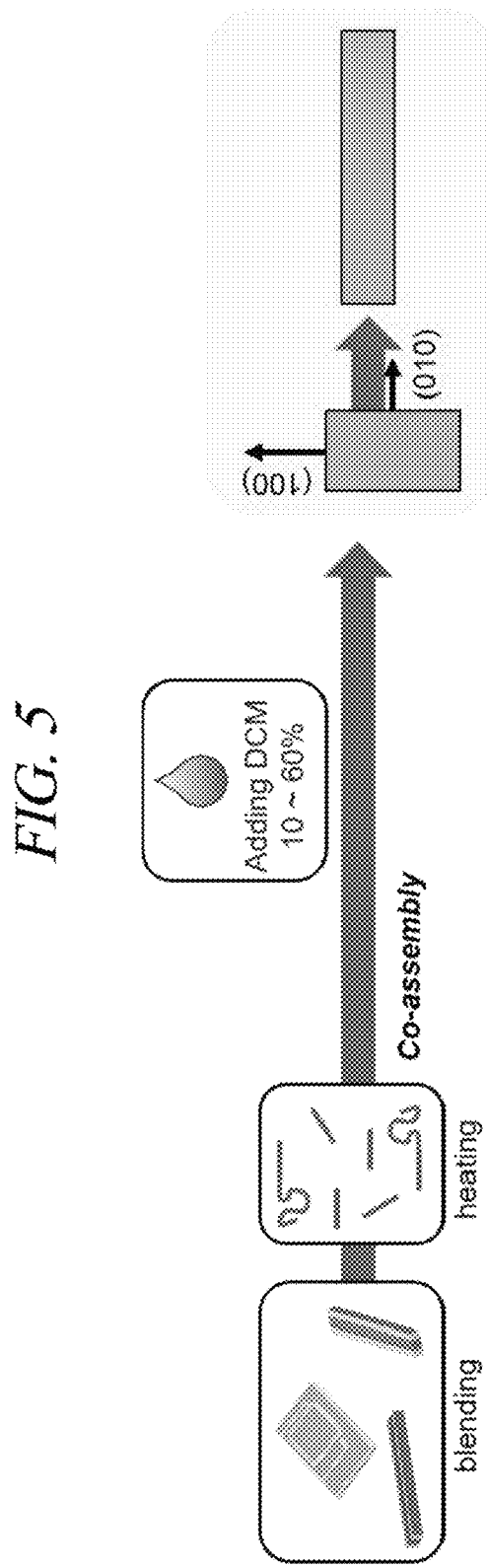
FIG. 5 is a schematic image the width tunable method of 2D nanosheet by adding the co-solvent according to an example of the present disclosure.
Figure 6A:
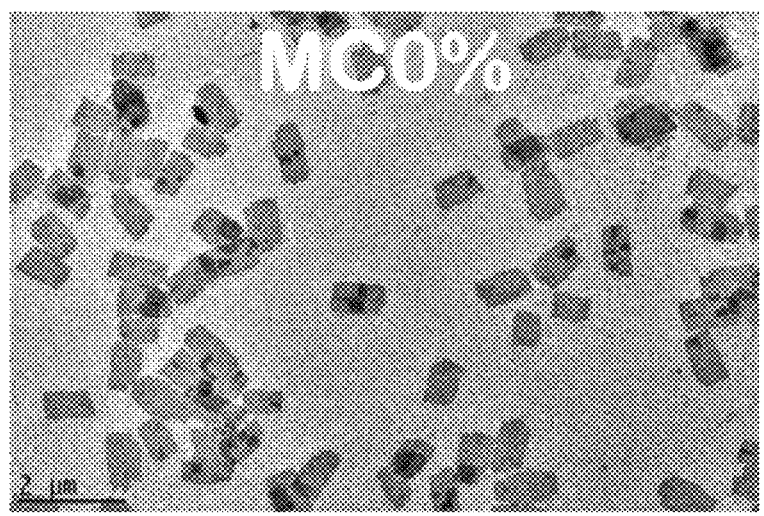
FIGS. 6A to 6G are TEM images of 2D nanosheets of which lengths and widths are respectively tuned variously according to an example of the present disclosure.
Figure 6B:
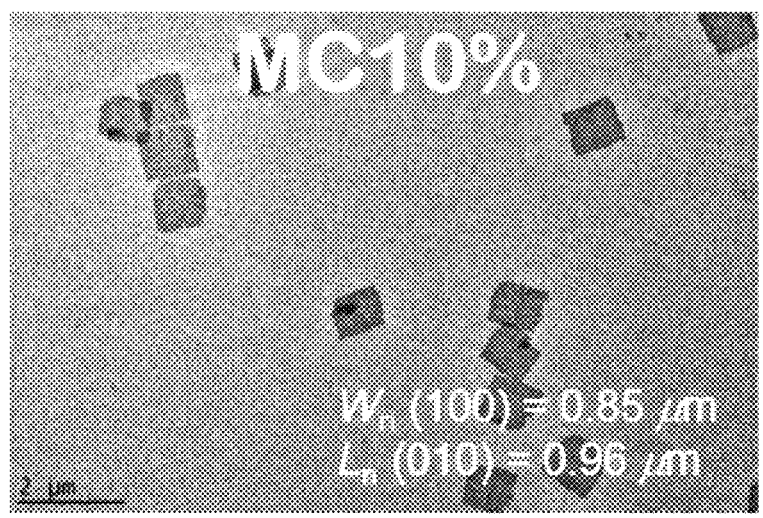
Figure 6C:
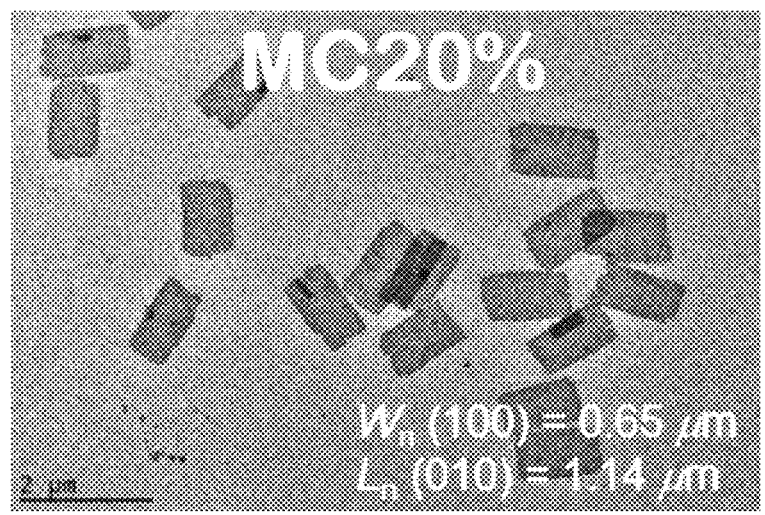
Figure 6D:
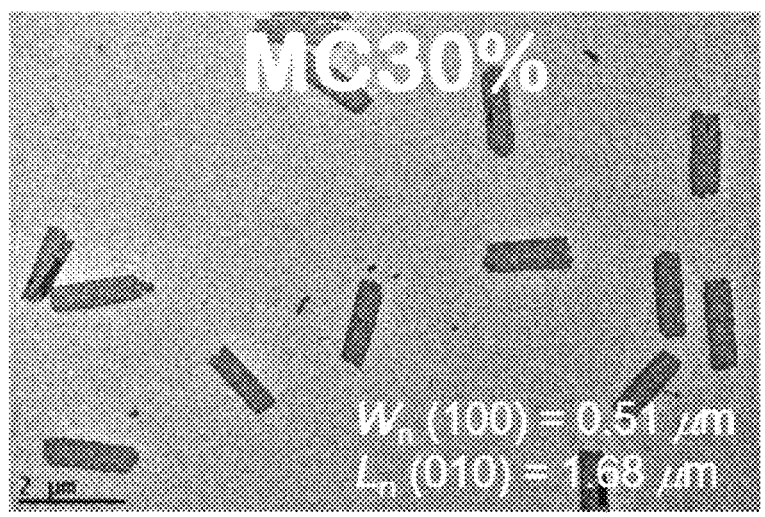
Figure 6E:
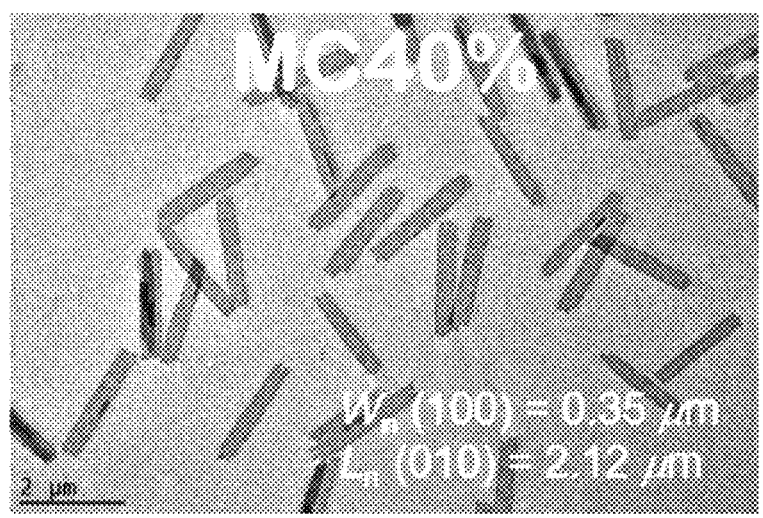
Figure 6F:
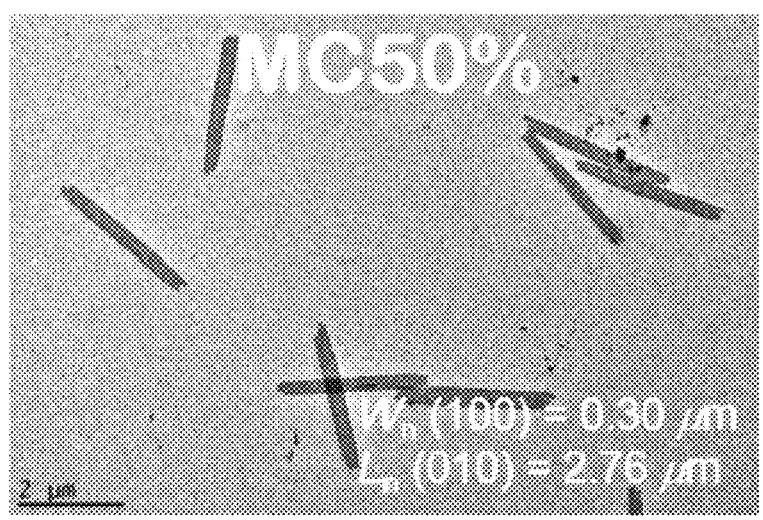
Figure 6G:
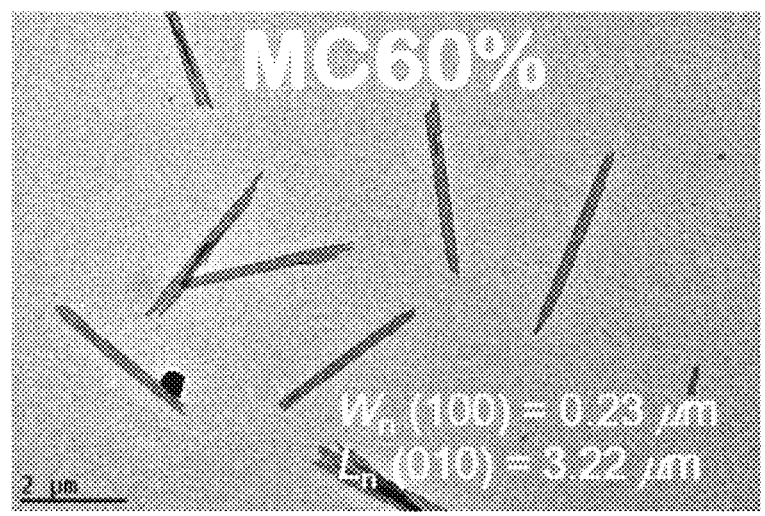
Figure 7A:
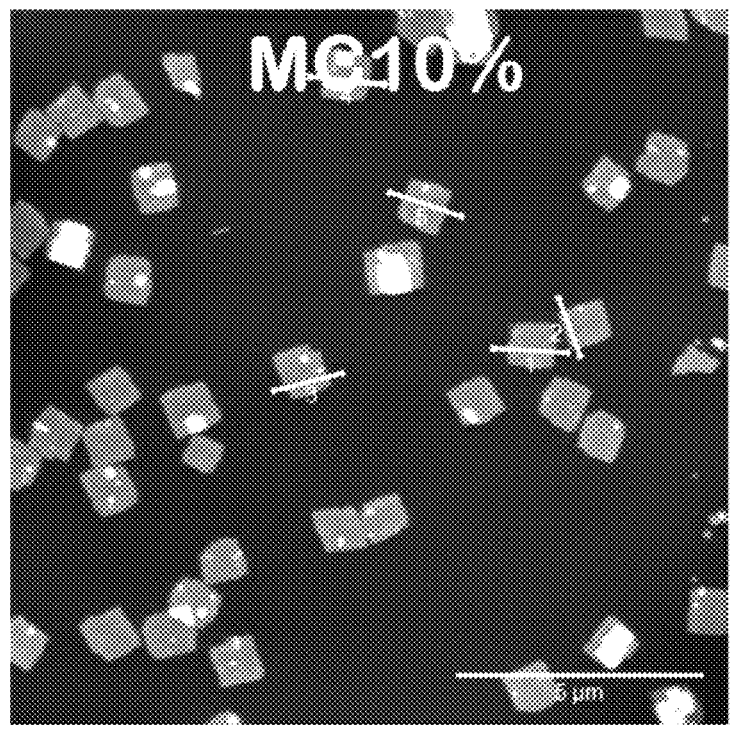
FIGS. 7A to 7L are respectively AFM images and profiles of 2D nanosheets of which lengths and widths are respectively tuned variously according to an example of the present disclosure.
Figure 7B:
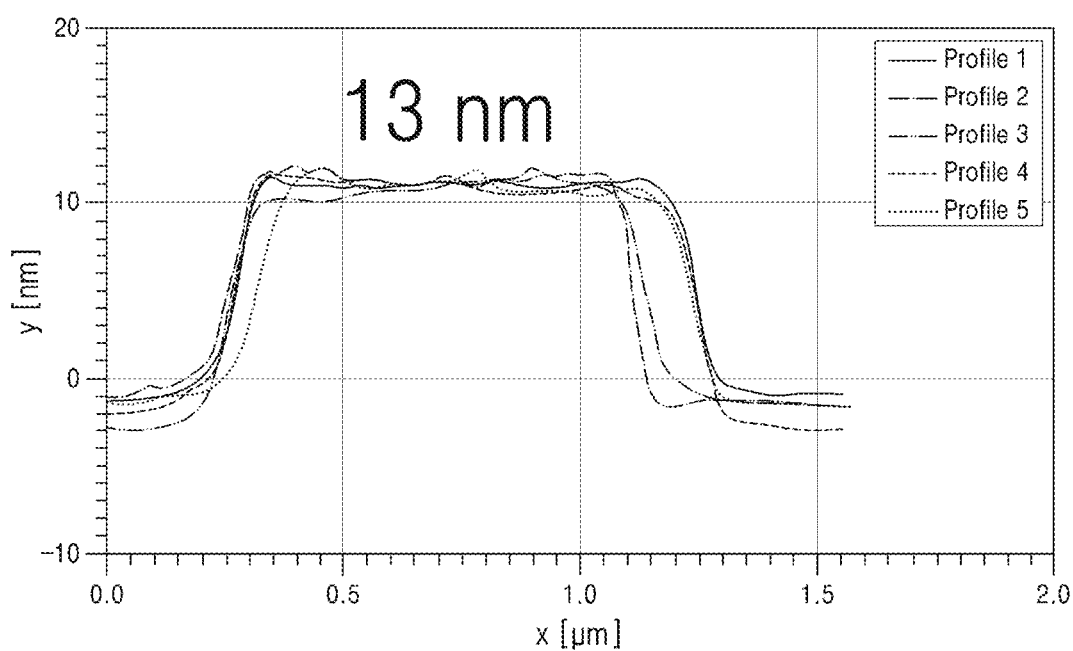
Figure 7C:
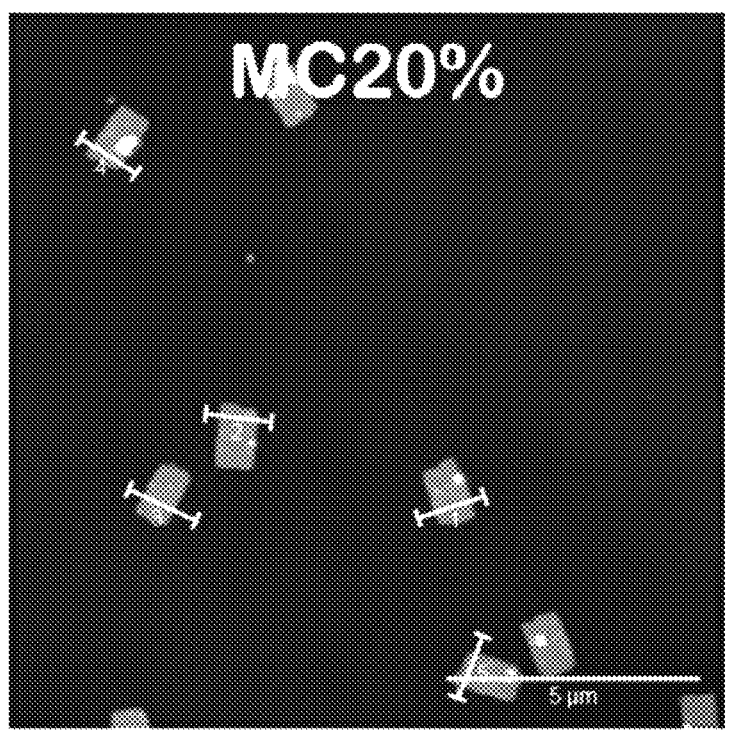
Figure 7D:
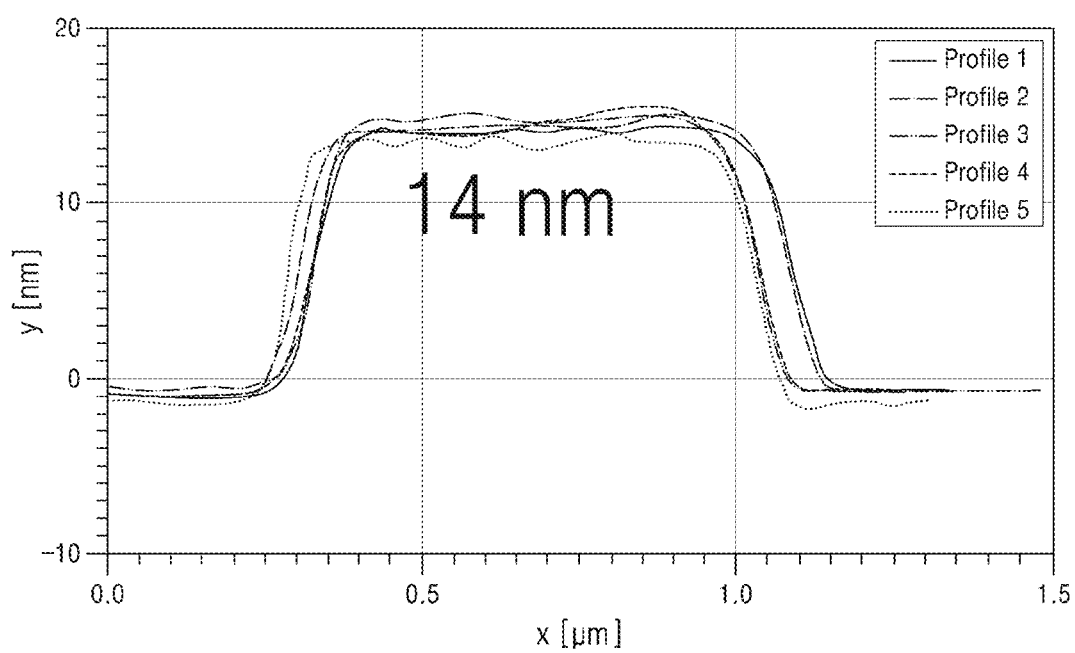
Figure 7E:
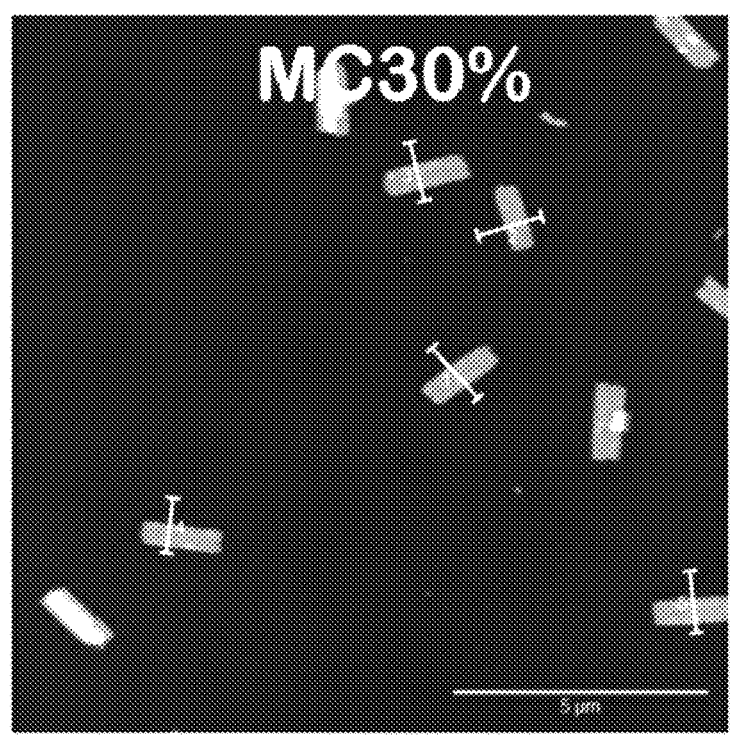
Figure 7F:
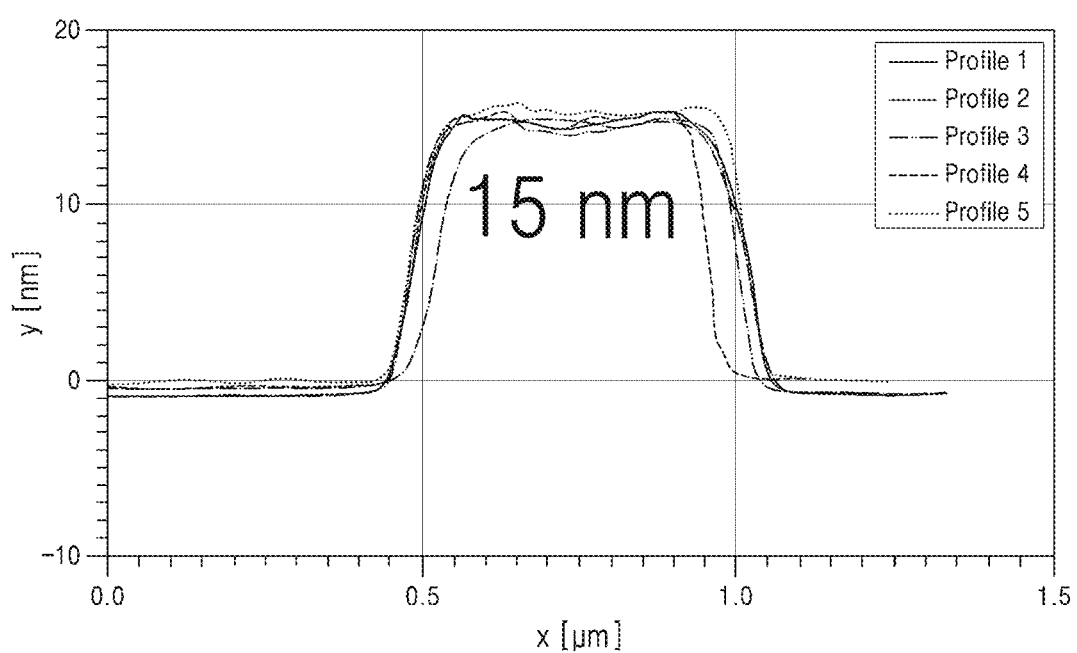
Figure 7G:
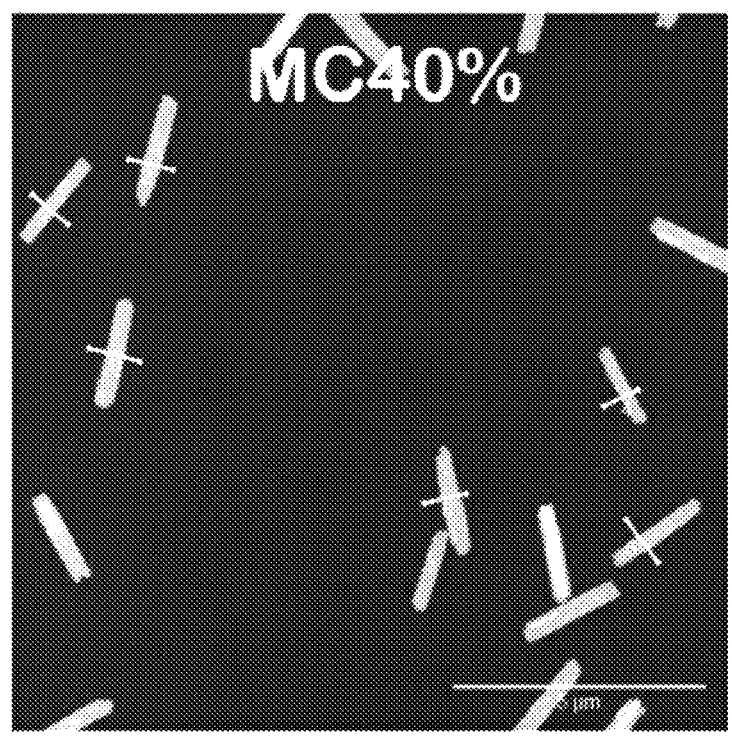
Figure 7H:
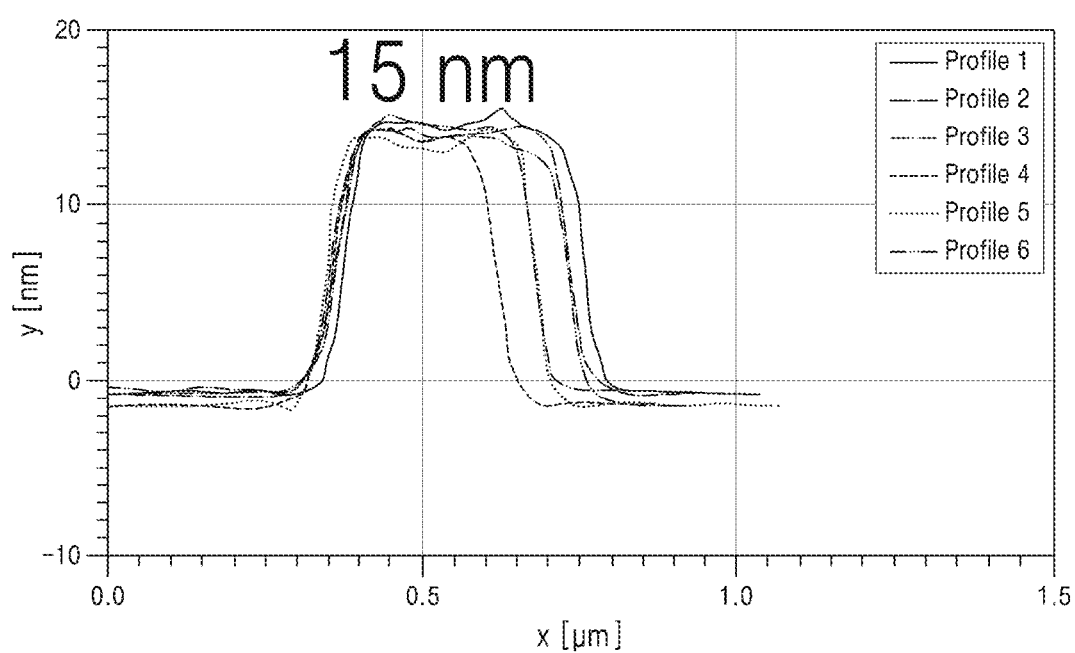
Figure 7I:
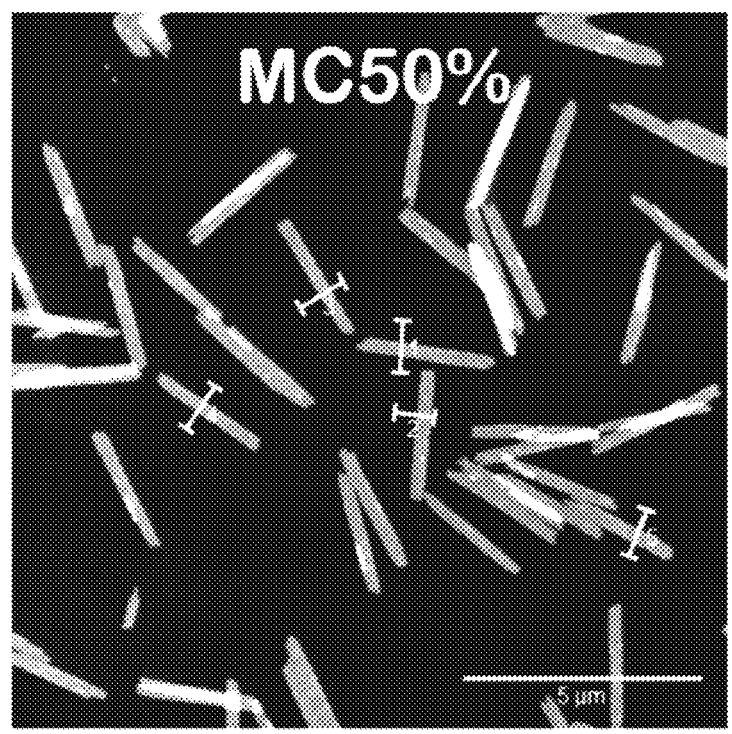
Figure 7J:
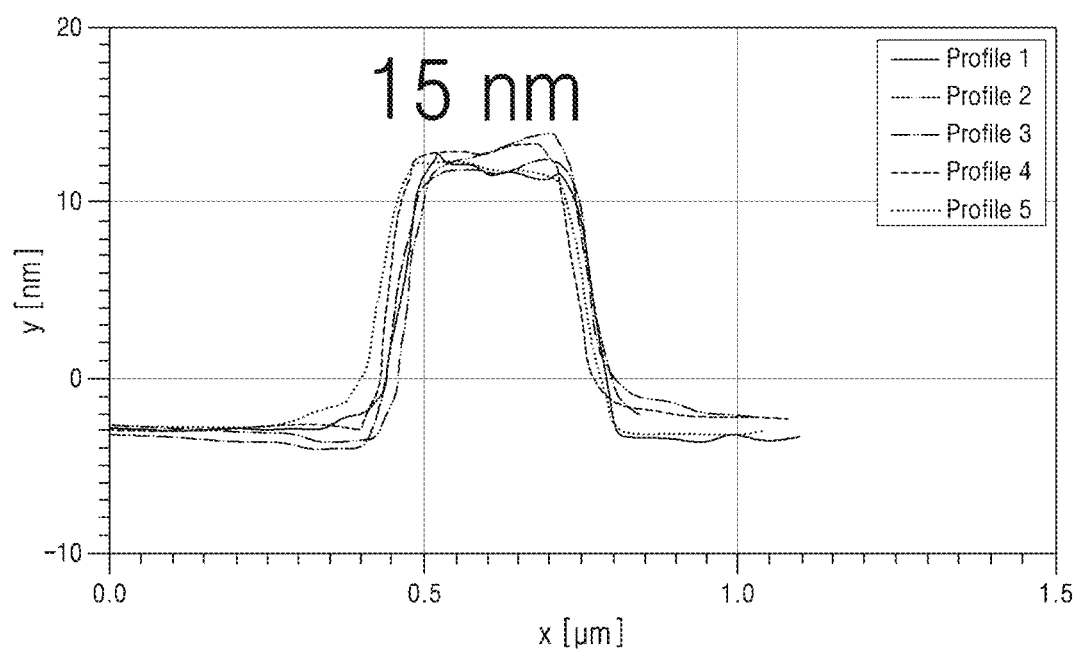
Figure 7K:
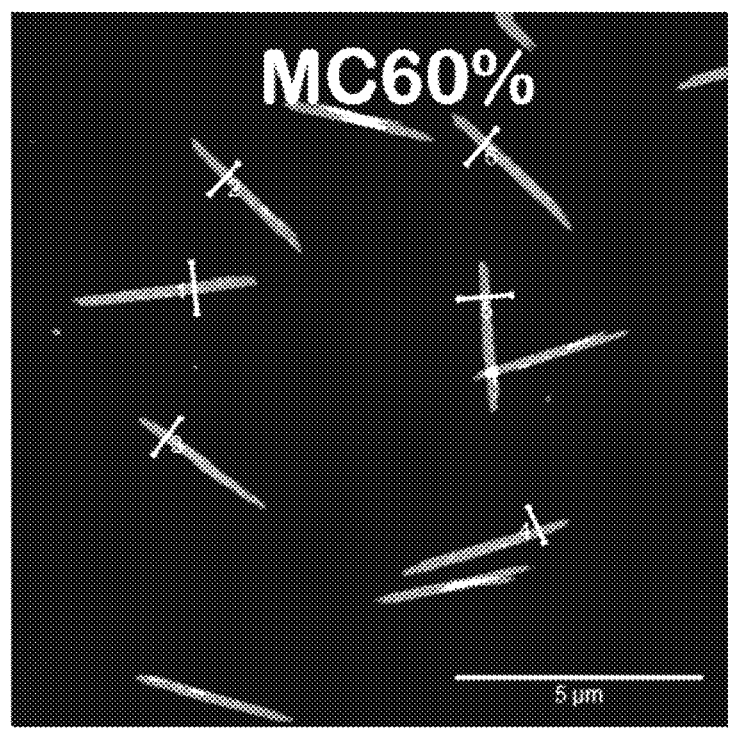
Figure 7L:
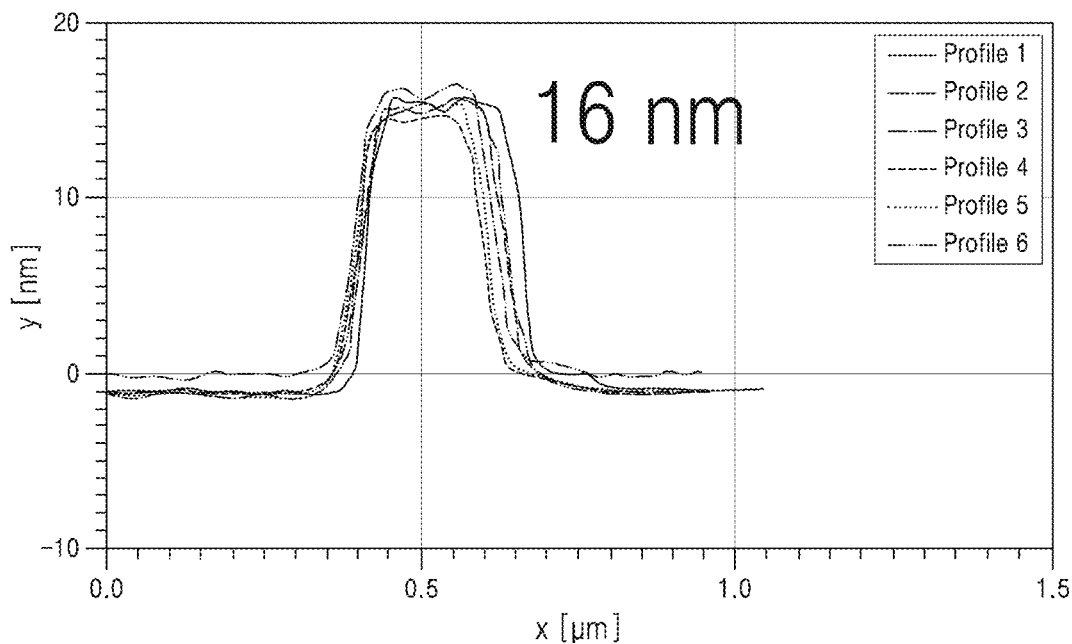
Figure 8A:
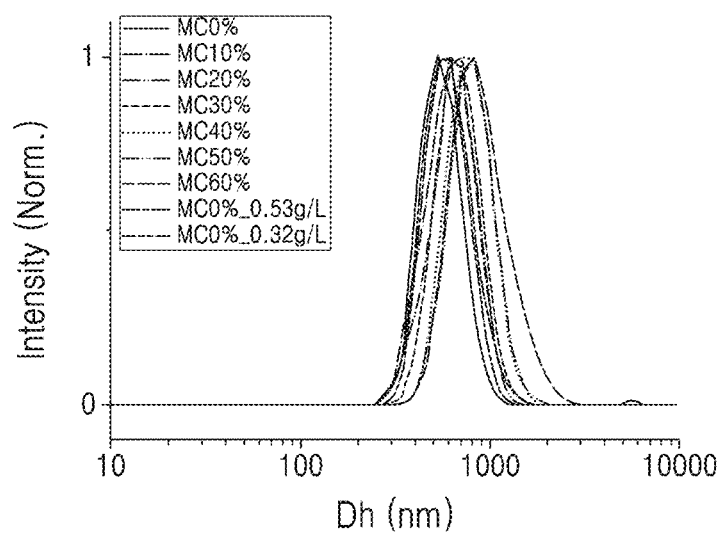
FIGS. 8A to 8E are respectively DLS analysis; UV-vis absorption analysis; and plots of width and length changes according to the ratio of the co-solvent, area change according to the ratio of the co-solvent, and aspect ratio change according to the ratio of the co-solvent according to an example of the present disclosure.
Figure 8B:
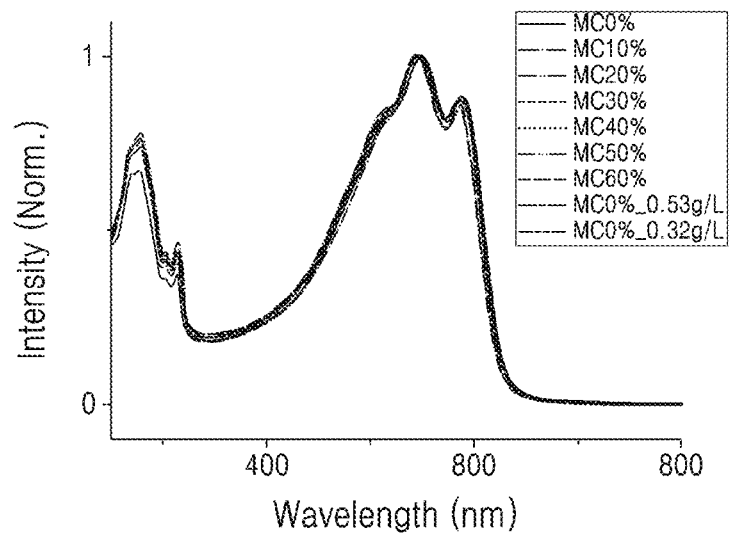
Figure 8C:
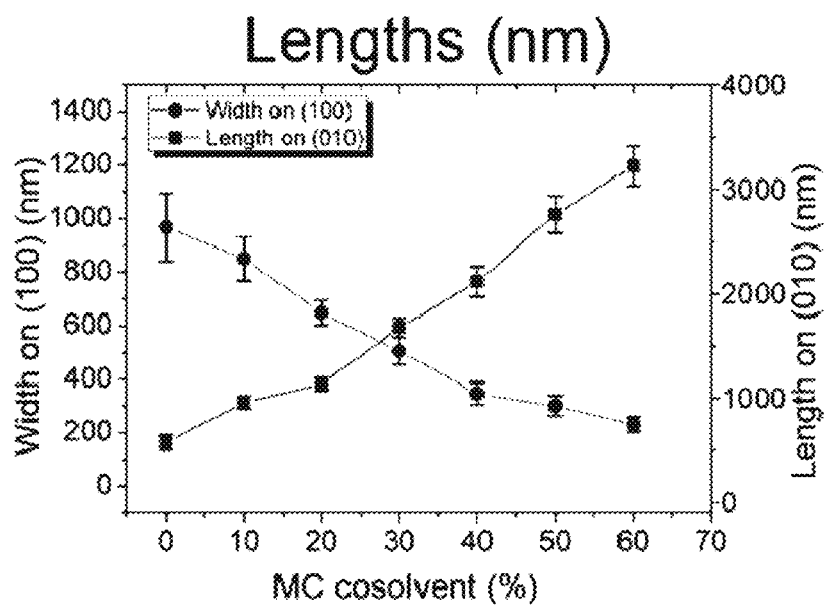
Figure 8D:
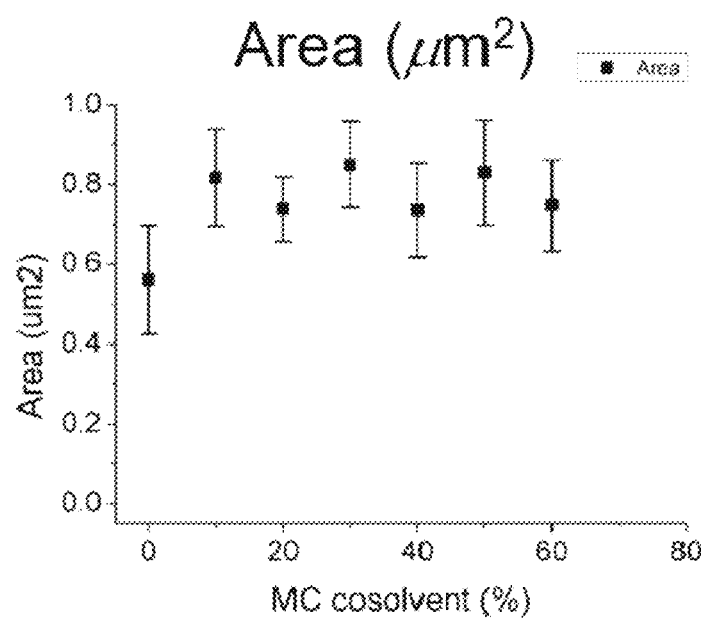
Figure 8E:
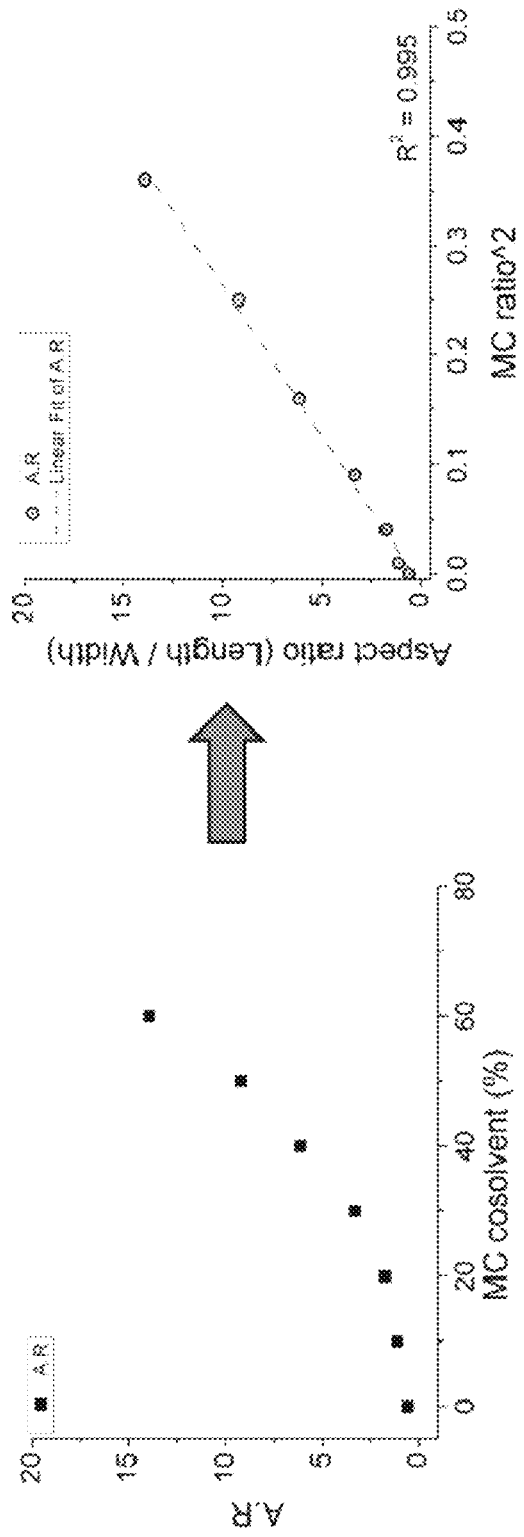
Figure 9A:
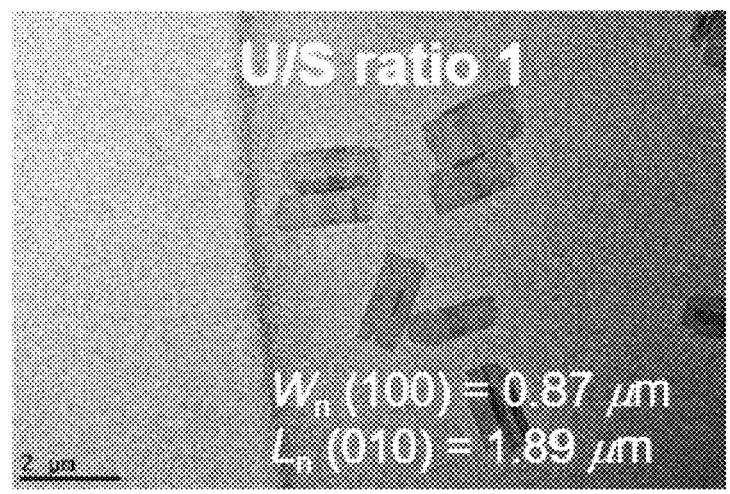
FIGS. 9A to 9E are respectively TEM images of 2D nanosheets obtained by adjusting the length from 1.9 μm to 4.2 μm according to U/S ratio using 2D seed, of which width is 910 nm, according to an example of the present disclosure.
Figure 9B:
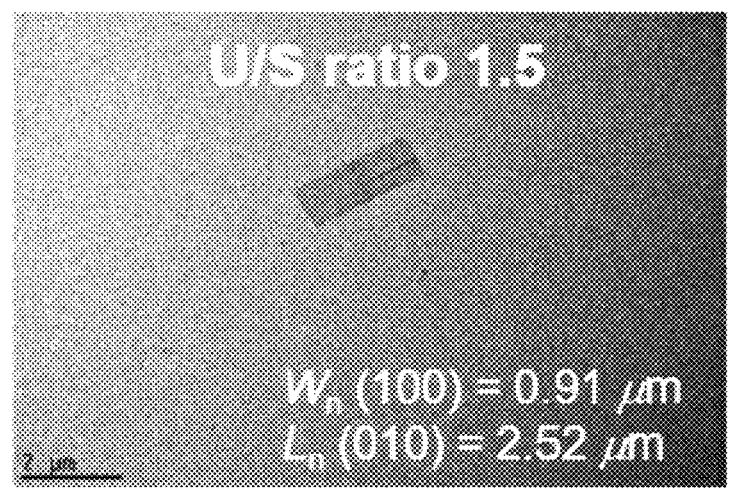
Figure 9C:
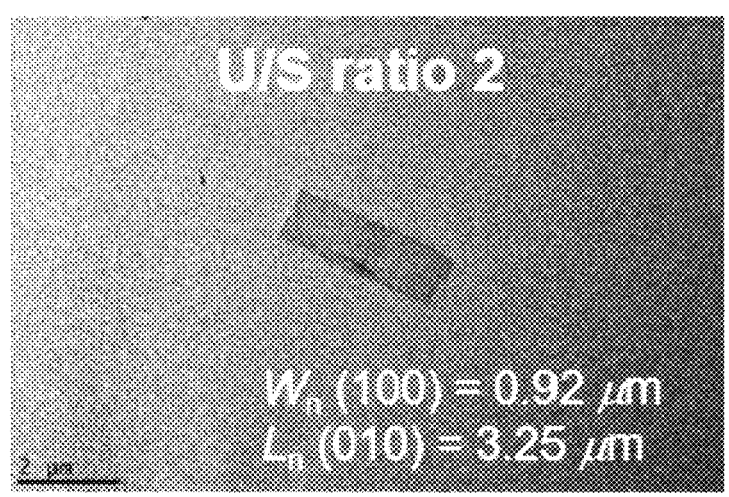
Figure 9D:
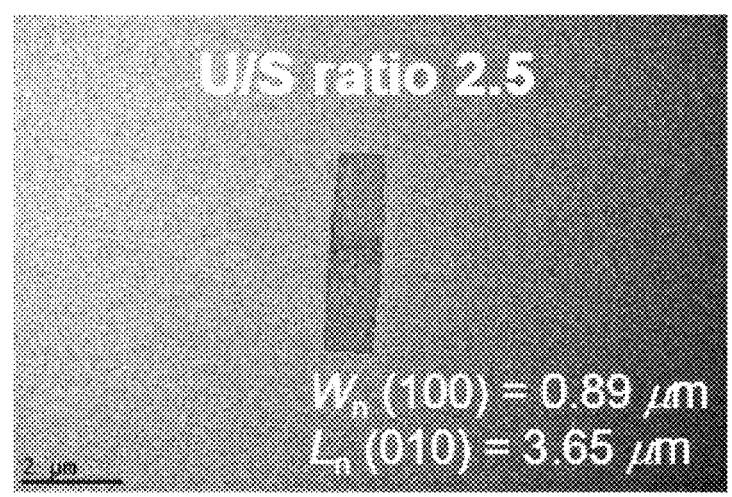
Figure 9E:
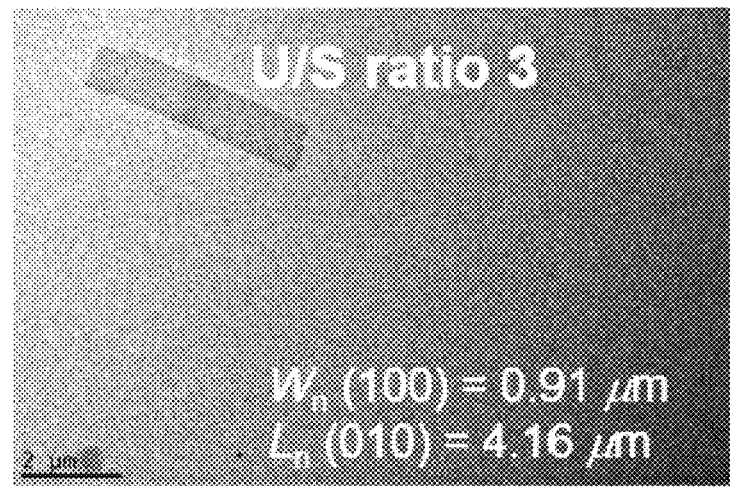
Figure 9F:
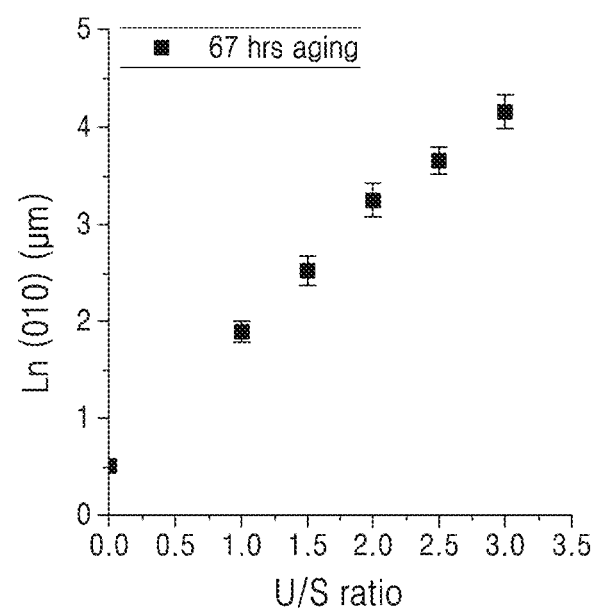
FIGS. 9F and 9G are respectively plots showing $L_n$ changes of the aging results of 67 hours, or 45 hours and 67 hours along the direction of (010) according to U/S ratios of 2D nanosheets obtained by adjusting their length from 1.9 μm to 4.2 μm according to U/S ratio using 2D seed, of which width is 910 nm, according to an example of the present disclosure.
Figure 9G:
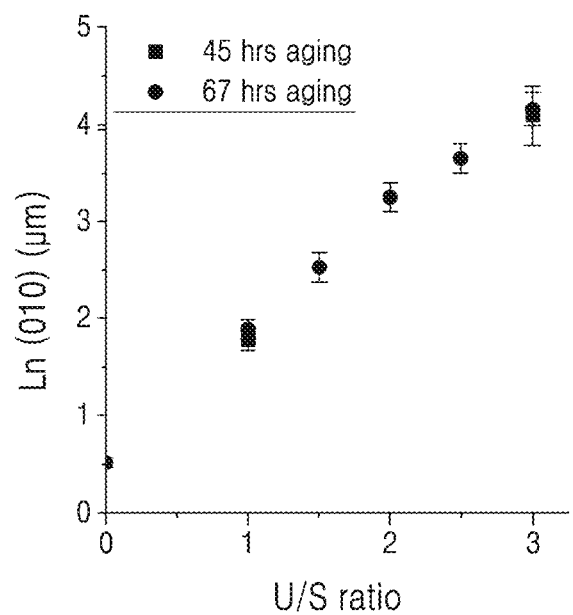
Figure 10A:
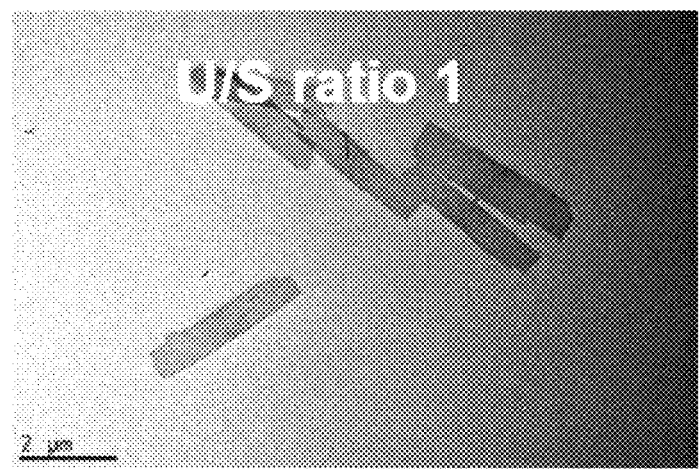
FIGS. 10A to 10E are respectively TEM images of 2D nanosheets obtained by adjusting the length from 3.3 μm to 5.3 μm according to U/S ratio using 2D seed, of which width is 850 nm, according to an example of the present disclosure.
Figure 10B:
Figure 10C:
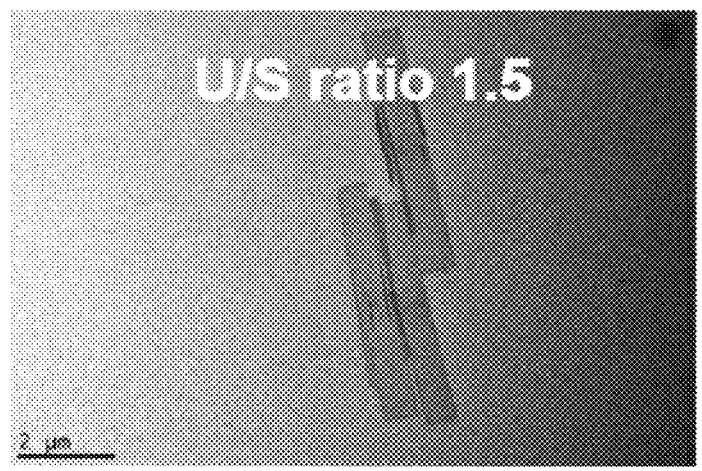
Figure 10D:
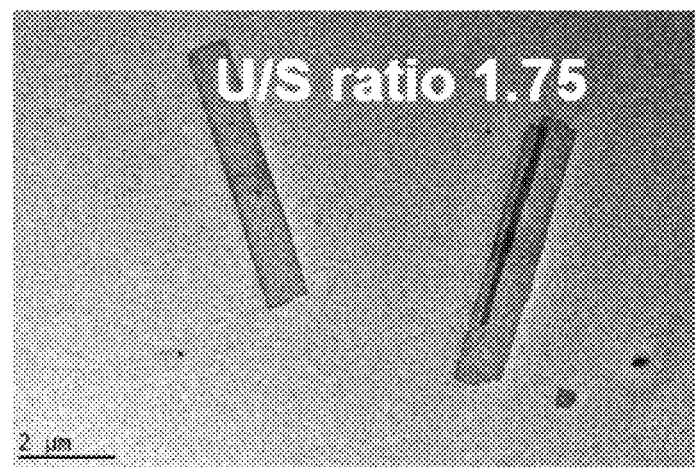
Figure 10E:
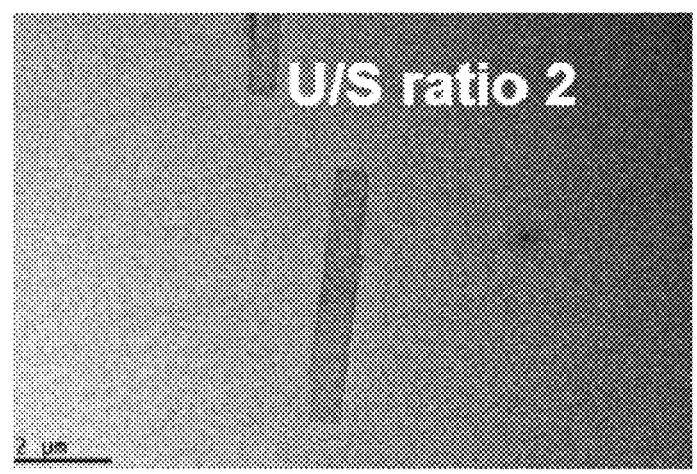
Figure 10F:
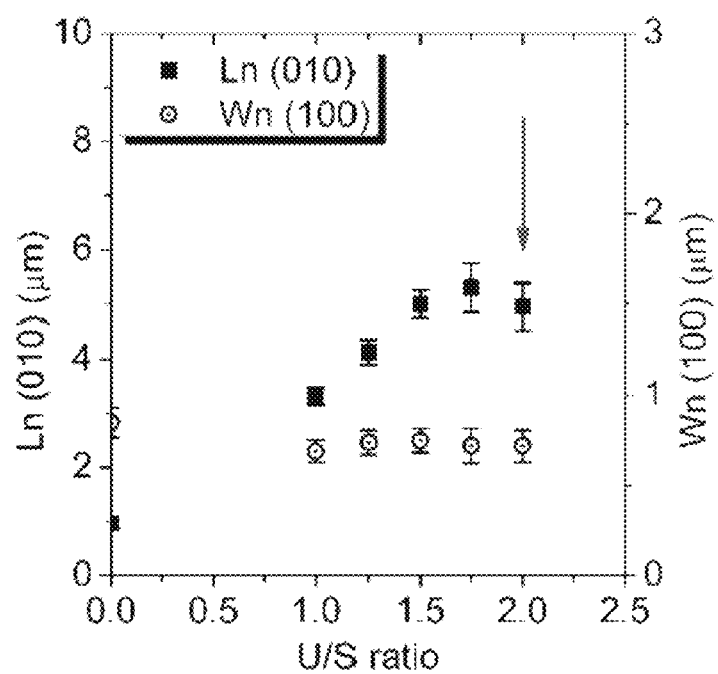
FIG. 10F is plots showing $L_n$ changes in a direction of (010) according to U/S ratios of 2D nanosheets obtained by adjusting the length from 3.3 μm to 5.3 μm according to U/S ratio using 2D seed, of which width is 850 nm, according to an example of the present disclosure.
Figure 11A:
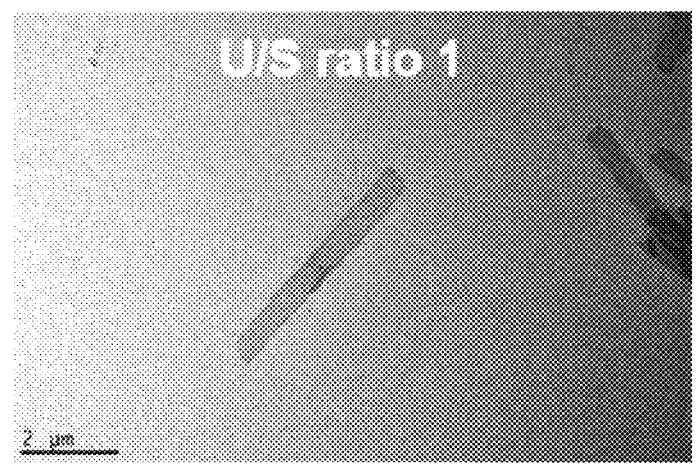
FIGS. 11A to 11C are respectively TEM images of 2D nanosheets obtained by adjusting the length from 5.1 μm to 8.0 μm according to U/S ratio using 2D seed, of which width is 650 nm, according to an example of the present disclosure.
Figure 11B:
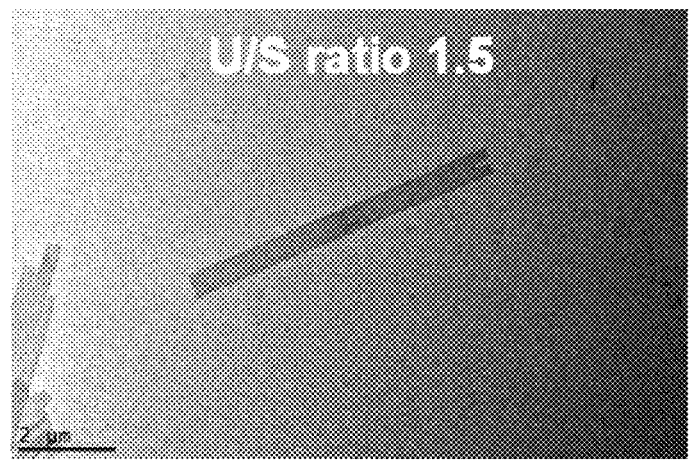
Figure 11C:
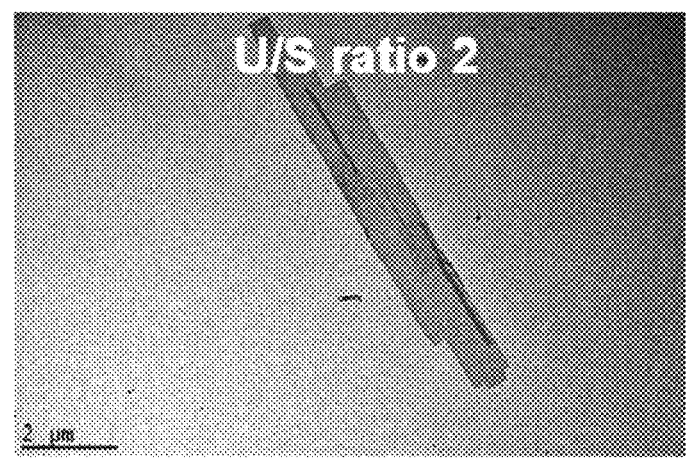
Figure 11D:
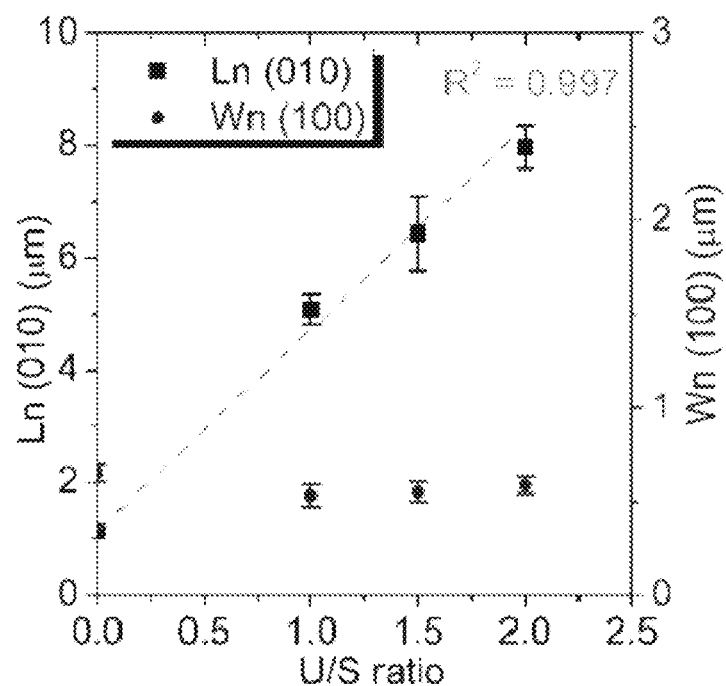
FIG. 11D is plots showing $L_n$ change along the direction of (010) and $W_n$ change along the direction of (100) according to U/S ratios of 2D nanosheets obtained by adjusting the length from 5.1 μm to 8.0 μm according to U/S ratio using 2D seed, of which width is 650 nm, of the present disclosure.
Figure 12A:
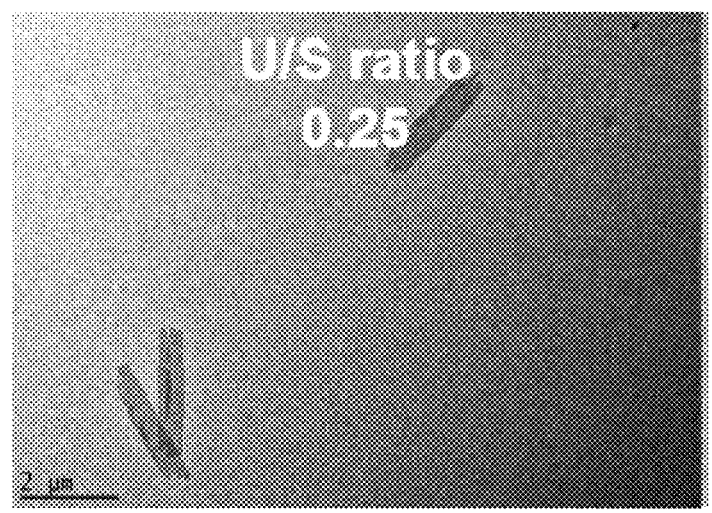
FIGS. 12A to 12E are, according to an example of the present disclosure, respectively TEM images of 2D nanosheets obtained by adjusting the length from 1.7 μm to 4.9 μm according to U/S ratio using 2D seed, of which width is 510 nm. Further.
Figure 12B:
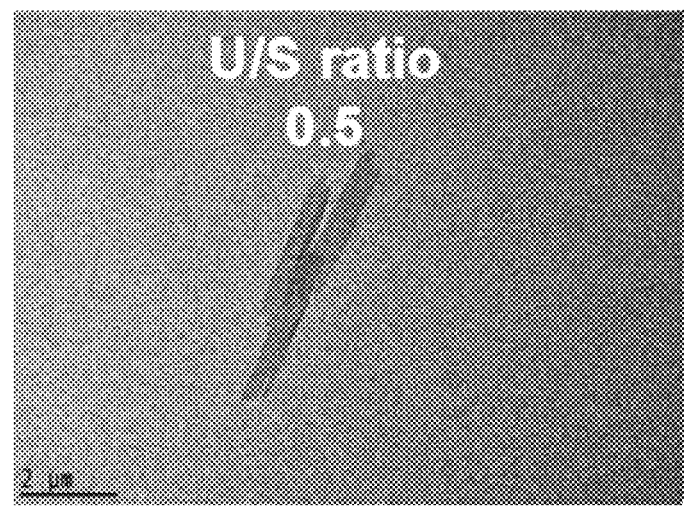
Figure 12C:
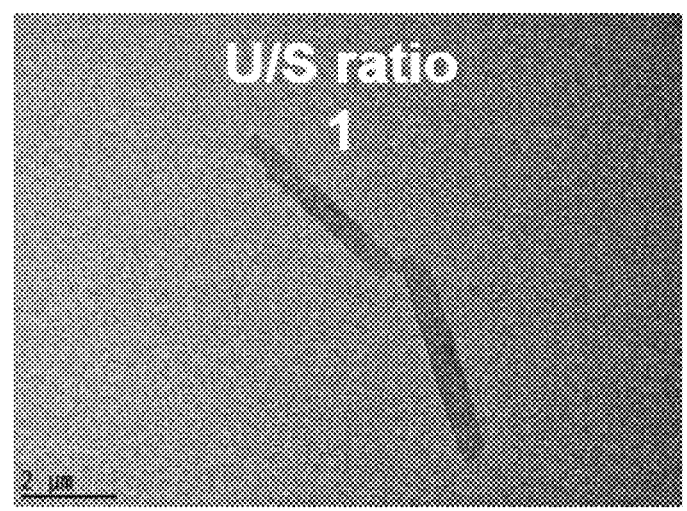
Figure 12D:
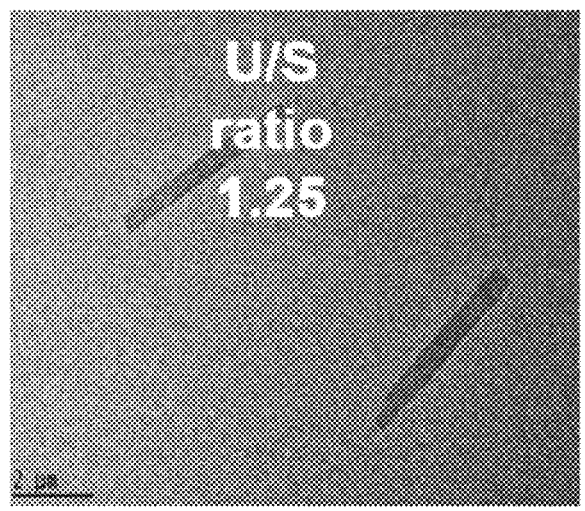
Figure 12E:
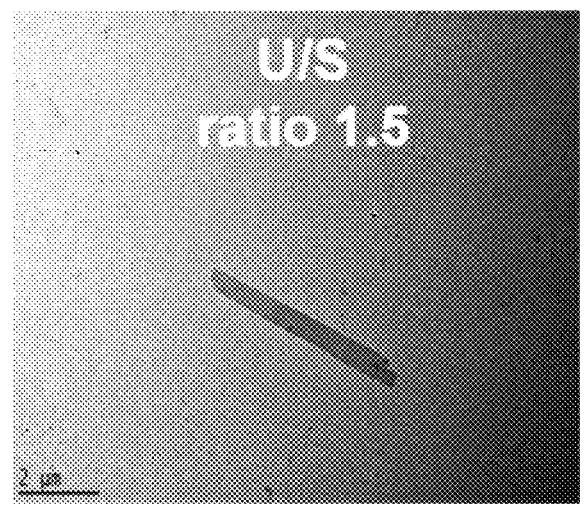
Figure 12F:
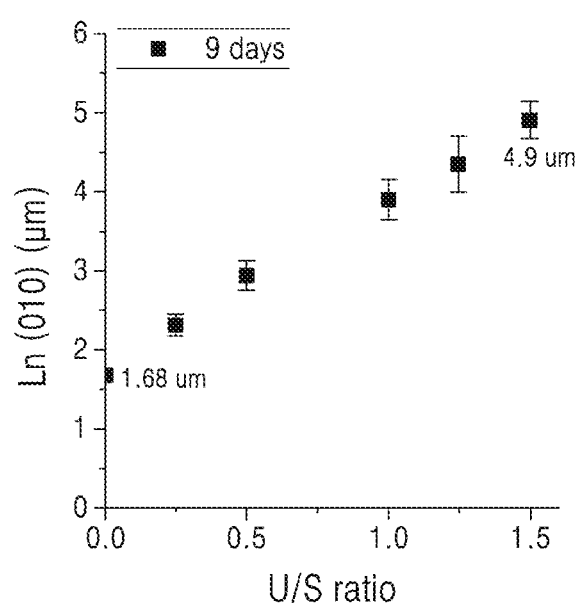
FIG. 12F is a plot showing $L_n$ change along the direction of (010) according to U/S ratios of 2D nanosheet obtained by adjusting the length from 1.7 μm to 4.9 μm according to U/S ratio using 2D seed, of which width is 510 nm, according to an example of the present disclosure.

As shown in FIG. 5, after several optimizations, a 0.75 g/L chloroform blend solution of P150-b-P222 and P222 in same weight ratio of 2:1 (molar ratio=1:2) was heated at 50° C. for 1 hour, and then the co-solvent DCM (the volume % of the co-solvent DCM added when the seed was formed=SMC %) was added thereto so that the respective final volume % was made to 10%, 20%, 30%, 40%, 50%, 60% and 70%. After aging at 25° C. for 2 days, changes of width (Wn) and length (Ln) of the prepared 2D rectangles were confirmed by TEM and AFM imaging. It was confirmed that the average widths were adjusted from 950 nm to 230 nm and the average lengths were adjusted from 570 nm to 3,220 nm according to the volume % of co-solvent DCM (MC) with respect to total solution. Further, the aspect ratio increased more than 20 times from 0.6 to 14, which demonstrates the linear dependence of aspect ratio of the nanosheet by the co-solvent effect. Specifically, it was confirmed that as the concentration of the added DCM increases, the width in the direction of (100) decreases and the lengths in the direction of (010) increases (FIGS. 6A to 6G, and FIGS. 7A to 7L). Further, after aging at 25° C. for 3 days and diluting to 0.05 g/L, DLS analysis, UV-vis absorption analysis and statistical analysis were performed on the structures of the 2D nanosheet, it was confirmed that the width and the length can be linearly tunable according to the percentage of the co-solvent, and the resulting 2D seeds have very narrow disparities of length and area of 1.1 or less (FIGS. 8A to 8E).

(6) Preparation of 2D Nanostructure with Adjusted Height According to Self-Assembly Selectively Grown in a Height Direction from 2D Seed with Adjusted Width The inventors provided an environment in which the width and length of the 2D nanosheet, of which length is additionally adjusted using the obtained width-adjusted uniform 2D seed, are simultaneously adjusted via CDSA through seeded-growth. The 2D seeds of which widths were adjusted according to the volume ratio (0%, 10%, 20%, and 30%) of the co-solvent DCM at the time of seed formation ("SMC") were used. Then, according to U/S ratio was adjusted, the 2D nanosheet whose length is adjusted by selectively growing in the (010) direction was prepared. In addition, in order to increase the rate of the length adjustment, the inventors added co-solvent DCM during CDSA process ("CMC") through seeded-growth to adjust the length of the nanosheet. In this case, the volume % of DCM was set to 50%. In the conditions of each experiment, conditions other than the volume ratio of SMC and U/S ratio were set the same:

1) the concentration of the 2D seed: 0.2 g/L (in chloroform)
2) the molecular weight ($M_w$): 6.05 kDa
3) CMC %: 50%
4) aging temperature and time: 25° C. and 1-3 days Interestingly, uniaxial living 2D CDSA occurred regardless of CMC 50%, and the length increased linearly according to U/S ratio. First, the length adjustment of the 2D seed of SMC 0% having 970 nm of the width succeeded from 1,890 nm to 4,160 nm (FIGS. 9A to 9G). The length adjustment of the 2D seed having 850 nm of the width succeeded from 3,300 nm to 5,300 nm (FIGS. 10A to 10F). The length adjustment of the 2D seed having 650 nm of the width succeeded from 5,100 nm to 8,000 nm (FIGS. 11A to 11D). Lastly, the length adjustment of the 2D seed having 510 nm of the width succeeded from 1,700 nm to 4,900 nm (FIGS. 12A to 12F). The inventors have succeeded in providing the environment of preparing the 2D nanosheet with the simultaneously adjusted width and length via length-tunable CDSA using the width adjusted 2D seed.

Figure 13:
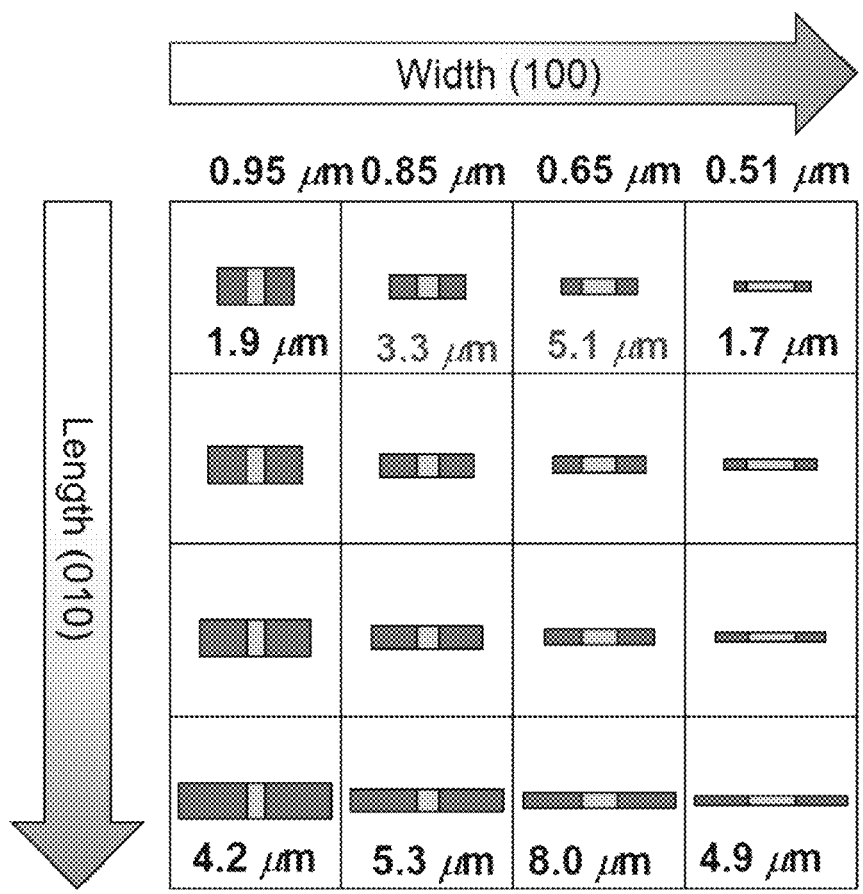
FIG. 13 is a schematic image showing 2D nanosheets additionally adjusted in length based on 2D seeds of which widths and lengths are adjusted according to an example of the present disclosure.

As a result, 7 types of the 2D seed structures can be formed depending on the SMC %, the width of the 2D nanosheet was tunable from 970 nm to 230 nm in the (100) direction, and the length of the 2D nanosheet was tunable from 570 nm to 3,220 nm in the (010) direction. In addition, under adjusting the U/S ratio, it was possible to adjust the average length of the 2D nanosheet from 2 µm to 8 µm based on the 2D seed of which width was from 970 nm to 510 nm via 2D CDSA process. FIG. 13 shows the overall results of the width and length adjustment of the 2D nanosheet. The above results show an excellent example of a combination of strategies which can be used to prepare more elaborately designed nanostructures based on a deep understanding of the 2D assembly and the width and length adjustment.

4. Conclusion

In conclusion, the inventors successfully demonstrated the formation of uniform semi-conducting 2D rectangles having sharp edges from a semi-crystalline conjugated homopolymer by the uniaxial seeded-growth approach. This intriguing direction-selective assembly allowed us to control the length of 2D rectangles for the first time with narrow dispersity through 2D CDSA. Taking advantage of this uniaxial growth from a homopolymer, 2D growth kinetic studies revealed that the homopolymer self-assembly followed ideal first-order kinetics, similar to living polymerization. This result indicates that the polymer self-assembly follows ideal crystallization because disturbing elements, such as the conformational effect of a shell block or backbone chain-folding, were eliminated. Lastly, 2D CDSA produced several complex but well-controlled penta-BCMs using various sizes of P2. Ultimately, we succeeded in a one-shot BCM formation based on an understanding of the growth kinetics, which provided an excellent guideline for optimizing self-assembly conditions. These precisely controlled uniform fluorescent 2D nanostructures would have great potential for optoelectronic applications.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

What is claimed is:

1. A 2-dimensional polymer nanosheet, comprising:
a block copolymer represented by the following Chemical Formula 1 or the following Chemical Formula 2; and
a homopolymer represented by the following chemical formula 3:

[Chemical Formula 1]

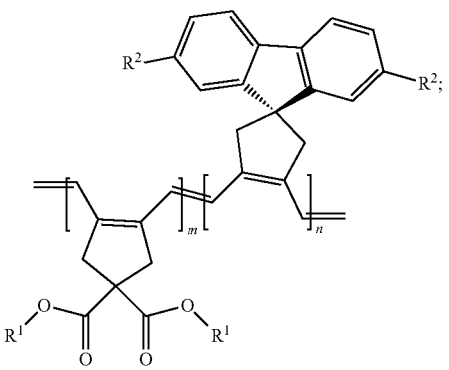

-continued

[Chemical Formula 2]

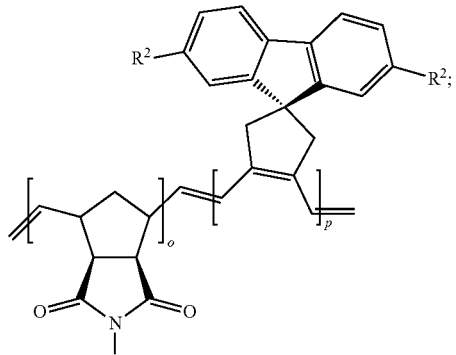

[Chemical Formula 3]

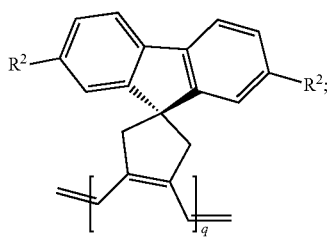

wherein, in the above Chemical Formula 1, Chemical Formula 2, and Chemical Formula 3,
each of $R^1$ to $R^3$ is independently, a substituted or unsubstituted, linear or branched $C_{1-8}$ alkyl group,
when at least one from $R^1$ to $R^3$ is substituted, it is substituted by $-SiR^aR^bR^c$,
each of $R^a$, $R^b$, and $R^c$ is independently a linear or branched $C_{1-4}$ alkyl group,
each of m and o is independently an integer of 20 to 70,
each of n and p is independently an integer of 5 to 70, and
q is an integer of 5 to 70.

2. The 2-dimensional polymer nanosheet of claim 1, wherein, each of $R^1$ and $R^3$ is independently, substituted or unsubstituted, methyl, ethyl, n-propyl, iso-propyl, n-butyl, sec-butyl, iso-butyl, tert-butyl, n-pentyl, sec-pentyl, 3-pentyl, iso-pentyl, tert-pentyl, neo-pentyl, sec-isopentyl, 2-methylbutyl, n-hexyl, sec-hexyl, 3-hexyl, iso-hexyl, tert-hexyl, sec-isohexyl, 3-isohexyl, 2-methylpentyl, 3,3-dimethylbutyl, 3-ethylbutyl, 2,2-dimethylbutyl, n-heptyl, iso-heptyl, neo-heptyl, tert-heptyl, sec-heptyl, n-octyl, iso-octyl, or 2-ethylhexyl.

3. The 2-dimensional polymer nanosheet of claim 1, wherein $R^2$ is, substituted or unsubstituted, methyl, ethyl, n-propyl, iso-propyl, n-butyl, iso-butyl, sec-butyl, tert-butyl, n-pentyl, sec-pentyl, 3-pentyl, iso-pentyl, tert-pentyl, neo-pentyl, sec-isopentyl, 2-methylbutyl, n-hexyl, sec-hexyl, 3-hexyl, iso-hexyl, tert-hexyl, sec-isohexyl, 3-isohexyl, 2-methylpentyl, 3,3-dimethylbutyl, 3-ethylbutyl, or 2,2-dimethylbutyl.

4. The 2-dimensional polymer nanosheet of claim 1, wherein $-SiR^aR^bR^c$ is $-SiMe_3$, $-SiEt_3$, $-SiPr_3$, $-SiBu_3$, $-SiEtMe_2$, $-SiEt_2Me$, $-SiMe_2Pr$, $-SiMePr_2$, $-SiBuMe_2$, $-SiBu_2Me$, $-SiEt_2Pr$, $-SiEtPr_2$, $-SiBuEt_2$, $-SiBu_2Et$, $-SiBuPr_2$, or $-SiBu_2Pr$.

5. The 2-dimensional polymer nanosheet of claim 1, wherein a width (100) of the 2-dimensional polymer nanosheet is 100 nm to 10 μm.

6. The 2-dimensional polymer nanosheet of claim 1, wherein a length (010) of the 2-dimensional polymer nanosheet is 500 nm to 20 μm.

7. The 2-dimensional polymer nanosheet of claim 1, wherein a height of the 2-dimensional polymer nanosheet is 1 nm to 500 nm.

8. The 2-dimensional polymer nanosheet of claim 1, wherein the 2-dimensional polymer nanosheet has conductivity and/or fluorescence.

9. A method of preparing a 2-dimensional polymer nanosheet according to claim 1, comprising:
(a) mixing a block copolymer represented by the following Chemical Formula 1 or the following Chemical Formula 2, and a homopolymer represented by the following Chemical Formula 3 to obtain a 2-dimensional seed; and
(b) adding an unimer comprising the homopolymer represented by the following Chemical Formula 3 to the 2-dimensional seed to obtain a 2-dimensional polymer nanosheet:

[Chemical Formula 1]

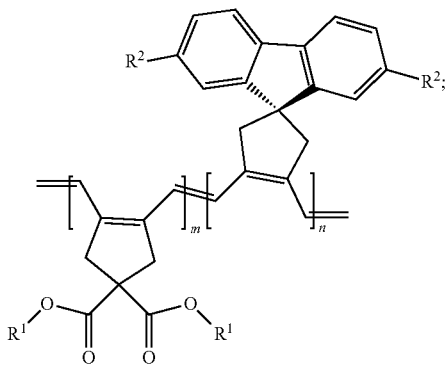

[Chemical Formula 2]

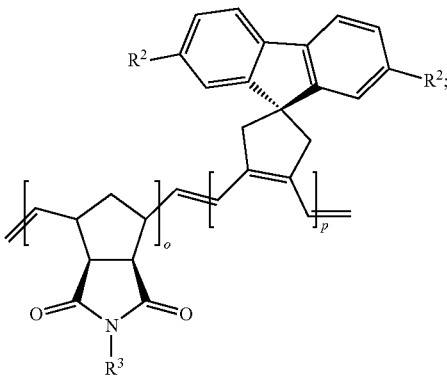

[Chemical Formula 3]

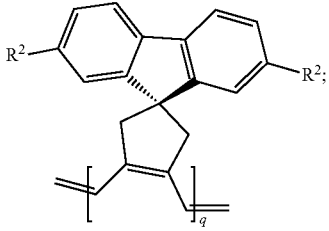

wherein, in the above Chemical Formula 1, Chemical Formula 2, and Chemical Formula 3,
each of $R^1$ to $R^3$ is independently, a substituted or unsubstituted, linear or branched $C_{1-8}$ alkyl group, when at least one from $R^1$ to $R^3$ is substituted, it is substituted by —SiR$^a$R$^b$R$^c$, each of $R^a$, $R^b$, and $R^c$ is independently a linear or branched $C_{1-4}$ alkyl group, each of m and o is independently an integer of 20 to 70, each of n and p is independently an integer of 5 to 70, and q is an integer of 5 to 70.

10. The method of claim 9,
wherein, in (a), the 2-dimensional seed is formed by co-assembly of the block copolymer and the homopolymer.

11. The method of claim 9,
wherein, in (b), the 2-dimensional polymer nanosheet is formed by seeded-growth.

12. The method of claim 11,
wherein the seeded-growth is a first-order reaction.

13. The method of claim 9,
wherein, (a) is conducted in presence of a first solvent, and
in (a), a width of the 2-dimensional seed is tunable by adding a second solvent different from the first solvent.

14. The method of claim 13,
wherein the first solvent is at least one selected from chloroform, dichloromethane, and tetrahydrofuran, and
wherein the second solvent is at least one selected from methyl chloride, dichloromethane, chloroform, tetrahydrofuran, toluene, chlorobenzene, dichlorobenzene, and o-dichlorobenzene.

15. The method of claim 9,
wherein, in (b), a length of the 2-dimensional polymer nanosheet is tunable according to the weight ratio of the unimer to the 2-dimensional seed.

16. The method of claim 9,
wherein, in (b), a height of the 2-dimensional polymer nanosheet is tunable according to degree of polymerization of the added unimer.

17. The method of claim 16,
wherein adding at least two unimers of which degree of polymerization is different to each other to form a block comicelle.

18. The method of claim 9, further comprising a heating step and/or an aging step in (a) and/or (b).

19. A device, comprising a 2-dimensional polymer nanosheet according to claim 1.

20. The device of claim 19,
wherein the device is transistor, sensor, imaging agent, light emitting diode, photovoltaic cell, or conductive display.

* * * * *